(12) United States Patent
Kim et al.

(10) Patent No.: US 11,698,705 B2
(45) Date of Patent: Jul. 11, 2023

(54) ELECTRONIC DEVICE AND SCREEN CONTROL METHOD THEREOF

(71) Applicant: Samsung Electronics Co., Ltd., Gyeonggi-do (KR)

(72) Inventors: Youngrog Kim, Gyeonggi-do (KR); Yangwook Kim, Gyeonggi-do (KR); Younghak Oh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/519,673

(22) Filed: Nov. 5, 2021

(65) Prior Publication Data
US 2022/0147196 A1    May 12, 2022

(30) Foreign Application Priority Data

Nov. 6, 2020   (KR) .................... 10-2020-0148034
Dec. 31, 2020  (KR) .................... 10-2020-0189680

(51) Int. Cl.
*G06F 1/16*      (2006.01)
*G06F 3/0481*    (2022.01)
(Continued)

(52) U.S. Cl.
CPC .......... *G06F 3/0481* (2013.01); *G06F 1/1624* (2013.01); *G06F 1/1652* (2013.01);
(Continued)

(58) Field of Classification Search
CPC .......... G09G 2340/04; G09G 2380/02; G09G 3/035; G06F 1/1652; G06F 2203/04803;
(Continued)

(56) References Cited

U.S. PATENT DOCUMENTS 9,460,330 B2 * 10/2016 Lee .................... G07C 9/37
9,928,571 B2    3/2018 Chi et al.
(Continued)

FOREIGN PATENT DOCUMENTS

KR      10-1406235 B1    6/2014
KR    10-2016-0113872 A  10/2016
(Continued)

OTHER PUBLICATIONS

International Search Report dated Feb. 25, 2022.
Written Opinion dated Feb. 25, 2022.

*Primary Examiner* — Dismery Mercedes
(74) *Attorney, Agent, or Firm* — Cha & Reiter, LLC

(57) ABSTRACT

An electronic device and method are disclosed herein. The electronic device includes: a display having a display area that is variable, at least one processor operably connected to the display. The processor implements the method, including: controlling the display to display a plurality of elements on the display, receiving a user input requesting resizing of the display area, in response to the user input, identifying a core element among the displayed plurality of elements, resizing the display area based on the received user input and the identified core element, wherein a first window in which the core element is displayed is resized in proportion to resizing of the display area.

19 Claims, 18 Drawing Sheets

(51) Int. Cl.
  *G06F 3/04845* (2022.01)
  *G06F 3/0488* (2022.01)
  *G06F 3/041* (2006.01)
(52) U.S. Cl.
  CPC ............ *G06F 3/041* (2013.01); *G06F 3/0488* (2013.01); *G06F 3/04845* (2013.01); *G06F 2203/04102* (2013.01); *G06F 2203/04803* (2013.01); *G09G 2380/02* (2013.01)
(58) Field of Classification Search
  CPC .. G06F 3/0482; G06F 3/0488; G06F 3/04845; G06F 3/04842; G06F 3/041; G06F 8/38
  See application file for complete search history.

(56) References Cited

U.S. PATENT DOCUMENTS

| | | | |
|---|---|---|---|
| 2006/0236264 | A1 | 10/2006 | Cain et al. |
| 2012/0159386 | A1 | 6/2012 | Kang et al. |
| 2012/0210273 | A1 | 8/2012 | Seong et al. |
| 2012/0320081 | A1* | 12/2012 | Kim .................... G06F 9/44505 345/619 |
| 2015/0185980 | A1* | 7/2015 | An ........................ G06F 3/0484 715/803 |
| 2015/0186024 | A1* | 7/2015 | Hong .................. G06F 3/04886 715/800 |
| 2016/0062552 | A1* | 3/2016 | Jeong .................... G06F 3/0481 715/788 |
| 2017/0286042 | A1* | 10/2017 | Lee ........................... G06F 9/46 |
| 2017/0308346 | A1* | 10/2017 | Lee ....................... G09G 3/2092 |
| 2018/0217679 | A1 | 8/2018 | Kwon et al. |
| 2018/0329550 | A1* | 11/2018 | Dellinger ............ G06F 3/04883 |
| 2018/0364827 | A1* | 12/2018 | Chung .................. G06F 1/1677 |
| 2018/0374452 | A1 | 12/2018 | Choi et al. |
| 2019/0065035 | A1* | 2/2019 | Lee ..................... G06F 3/04845 |
| 2019/0278336 | A1 | 9/2019 | Choi et al. |
| 2019/0346954 | A1* | 11/2019 | Jung ..................... G06F 3/0416 |
| 2020/0225848 | A1 | 7/2020 | Yoon et al. |

FOREIGN PATENT DOCUMENTS

| | | |
|---|---|---|
| KR | 10-2016-0149061 A | 12/2016 |
| KR | 10-2017-0011675 A | 2/2017 |
| KR | 10-2017-0058223 A | 5/2017 |
| KR | 10-2020-0088997 A | 7/2020 |

* cited by examiner

ELECTRONIC DEVICE AND SCREEN CONTROL METHOD THEREOF

CROSS-REFERENCE TO RELATED APPLICATION(S)

This application is based on and claims priority under 35 U.S.C. 119 to Korean Patent Application Nos. 10-2020-0148034 & 10-2020-0189680, filed on Nov. 6, 2020 & Dec. 31, 2020, in the Korean Intellectual Property Office, the disclosure of which is herein incorporated by reference in their entireties.

BACKGROUND

1) Field

The disclosure relates to an electronic device and a screen control method thereof.

2) Description of Related Art

Graphical user interfaces (GUI) often include windows displayed to a display of an electronic device. These windows may be resized. However, when a window is resized, this may require a change in the GUI layout configuration to accommodate the new size.

Recently, electronic devices have incorporated flexible housings and/or displays, which may allow change in the physical shape of a display screen. For example, foldable, rollable, and/or slidable smartphones may include structures capable of enlarging or reducing screen display area, which in turn maintains the portability of these devices while also providing enlarged screen display area when desired by a user.

The above information is presented as background information only to assist with an understanding of the disclosure. No determination has been made, and no assertion is made, as to whether any of the above might be applicable as prior art with regard to the disclosure.

SUMMARY

Unlike devices with fixed display areas, a flexible electronic devices may utilize a variety of screen configurations (e.g., a rolled-in/rolled-out state or, a slid-in/slid-out state). Therefore, the configuration of a GUI layout utilized for a fixed screen may be inappropriate for the more variable screens of flexible electronic devices.

If the size of the screen area is physically altered, a specific user interface (UI)/user experience (UX) set for flexible devices, and different from those of a fixed screen device, may be utilized.

For example, an electronic device with a fixed display would typically not require changing display configurations for a variety of screen display areas, because of the fixed screen. However, a flexible type of electronic device would need to adapt for on-demand enlargements and reductions of the screen, and account for effectively displaying information desired by a user on each potential physical configuration of the variable screen.

According to certain embodiments, there is provided an electronic device and a screen control method thereof, which recognizes the intention of a user according to a change in the size of a screen area, and effectively displays information desired by a user.

According to certain embodiments, there is provided an electronic device and a screen control method thereof, which enables the use of a core function in a size appropriate for a user demand, when enlarging/reducing a screen area.

The technical subject matter of the disclosure is not limited to the above-mentioned technical subject matter, and other technical subject matters which are not mentioned may be understood by those skilled in the art based on the following description.

In accordance with an aspect of the disclosure, an electronic device may include a display and at least one processor connected to the display. The processor may be configured to: receive a user input requesting resizing of the display area, in response to the user input, identify a core element among the displayed plurality of elements, and resize the display area based on the received user input and the identified core element, wherein a first window in which the core element is displayed is resized in proportion to resizing of the display area.

In accordance with an aspect of the disclosure, a screen control method of an electronic device including a display may include: displaying a plurality of elements on a display having a variable display area, receiving, via input circuitry, a user input requesting resizing of the display area, identifying, via at least one processor, a core element from among the displayed plurality of elements, and resizing the display area based on the received user input and the identified core element, wherein a first window in which the core element is displayed is resized in proportion to resizing of the display area.

According to certain embodiments, the needs of a user based on a change in the size of a screen area can be applied, and information desired by the user can be effectively displayed and delivered.

According to certain embodiments, a core function can be used in a size appropriate for a user demand when a screen area is enlarged/reduced.

In addition, various effects directly or indirectly recognized from the disclosure can be provided.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, certain embodiments will be described with reference to attached drawings.

Figure 1:
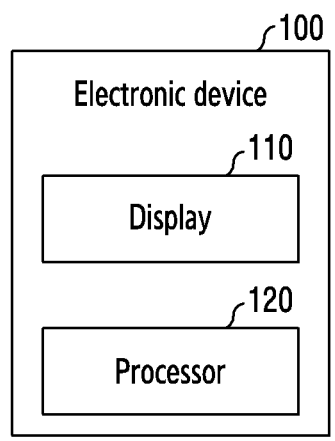
FIG. 1 is a block diagram illustrating an electronic device according to an embodiment.

FIG. 1 is a block diagram illustrating an electronic device according to an embodiment.

Referring to FIG. 1, an electronic device 100 according to an embodiment may include a display 110 and at least one processor 120. The display 110 and the processor 120 included in the electronic device 100 may be connected electrically and/or operatively and may exchange signals (e.g., commands or data) therebetween.

Figure 16:
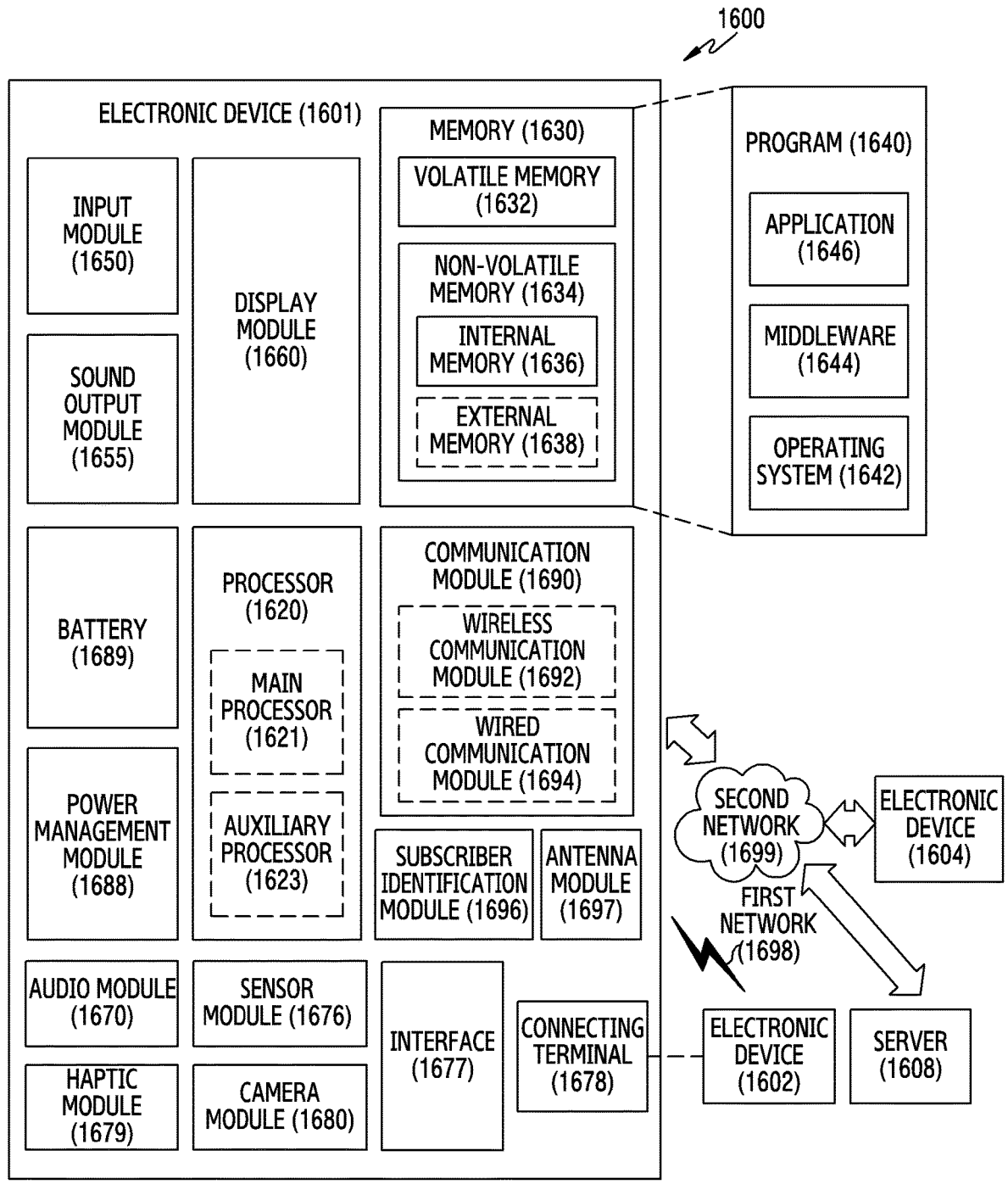
FIG. 16 is a block diagram of an electronic device in a network environment, according to certain embodiments.

The electronic device 100 may include at least a part of the electronic device 1601 illustrated in FIG. 16. For example, the display 110 may include a display module 1660 of FIG. 16. The processor 120 may include at least a part of the processor 1620 of FIG. 16.

The display 110 may include a screen area in which a content is displayed according to control by the processor 120 or handling by a user. The screen area may be one of a physical screen, a virtual screen, a full screen, or at least a part of the full screen of the display 110. For example, if the display 110 has a variable form factor, the size of the physical screen area of the display 110 may be changed by a user input (e.g., a roll-in/roll-out input or a slide-in/slide-out input). If the display 110 has a fixed form factor, the size of the screen area that is being displayed on the display 110 may be changed (e.g., enlarged/reduced) by a user input (e.g., a touch-and-spread input or a pinch-zoom in/out associated with two points on a screen area boundary).

The processor 120 may display a plurality of elements on the screen area of the display 110.

Each element may be one of the elements in the screen area. Each element may be one of various types of displayable elements. For example, an element may be at least one of text, an image, a video, a banner, an icon, a button, a menu, a Java script, a function object, an object, an object group, a symbol, a symbol group, a blank, an item, an item group, and a content. Each element may be a graphic element (or a user interface (UI)/user experience (UX) element or a visible element).

For example, the plurality of elements may be elements related to a first application (e.g., a foreground application). Some of the plurality of elements may be elements related to the first application (e.g., a foreground application), and other some may be elements related to a second application (e.g., a background application and a launcher application). Some of the plurality of elements may be elements related to a first screen (e.g., the current screen or a basic screen), and other some may be elements related to a second screen (e.g., a previous screen or a home screen).

The processor 120 may receive a user input for resizing (e.g., enlarging or reducing) the screen area of the display 110.

For example, the display 110 may be a rollable display. In this instance, a user input for resizing the screen area may be an input based on a rolling operation for resizing a screen of the rollable display. The rolling operation may be an automatic or a semi-automatic rolling operation by a driving body (e.g., a motor) included in the electronic device 100 according to a manual rolling operation or according to a user input. The display 110 may be a slidable display. In this instance, a user input for resizing the screen area may be an input based on a sliding operation for resizing a screen of the slidable display. The sliding operation may be an automatic or a semi-automatic sliding operation by a driving body (e.g., a motor) included in the electronic device 100 according to a manual sliding operation or according to a user input.

For example, the user input may be one of a roll-out input for enlarging the size of the screen area, a roll-in input for reducing the size of the screen area, a slide-out input for enlarging the size of the screen area, a slide-in input for reducing the size of the screen area, and a touch input (e.g., a multi-touch and spread) for enlarging or reducing the size of a window displayed in the screen area.

The processor 120 may identify a core element among a plurality of elements displayed in the screen area.

For example, all of the plurality of elements displayed in the screen area may be elements related to the first application (e.g., a music application). Some of the plurality of elements displayed in the screen area may be elements related to the first application (e.g., a music application), and other some may be elements related to the second application (e.g., a chatting application).

For example, the core element may be one of at least one object, an area including at least one object, or a window in the state of being enlarged/reduced (e.g., a full screen state, a state of being displayed in one of multiple windows, a mini-cropped state, or a floating state).

The processor 120 may display a screen area resized (enlarged or reduced) based on the size of the resized screen area and a core element. In the resized screen area, a window including the core element may be displayed in a size in accordance with the size of the resized screen area.

The size of the resized screen area of the display 110 and the size of the window including the core element in the screen area may be associated with each other. For example, as the size of the screen area is enlarged, the size of the window including the core element may be enlarged. As the size of the screen area is enlarged, the size of the window including the core element may be reduced. As the size of the screen area is reduced, the size of the window including the core element may be enlarged. As the size of the screen area is reduced, the size of the window including the core element may be reduced.

For example, in the screen area of the display 110 and the resized screen area, displaying of the core element may be maintained irrespective of a change in the size. The size of the displayed core element and the state of displaying may be maintained irrespective of the size of the resized screen area. In addition, the size of the displayed core element and the state of displaying may be changed according to the size of the resized screen area.

The window including the core element may be resized (e.g., enlarged or reduced) according to the size of the resized screen area. According to the size of the resized screen area and the size of the window (e.g., a first application area, a foreground application area, or a current screen area), a second window (e.g., a second application area, a background application area, a launcher application area, or a previous screen area) may be enlarged or reduced.

For example, as the size of the screen area is enlarged, displaying of the core element is maintained in the window in the enlarged screen area, and elements adjacent to the core element may be gradually reduced or disappear. In the second window of the enlarged screen area, a plurality of elements may be gradually enlarged or appear.

For example, as the size of the screen area is reduced, displaying of the core element is maintained in the window in the reduced screen area, and elements adjacent to the core element may be gradually enlarged or appear. In the second window of the reduced screen area, a plurality of elements may be gradually reduced or disappear.

The core element may be identified based on a touch input (e.g., a touch, a multi-touch, a tap, a double tap, a long tap, a touch and hold, a tap and hold, a press, a spread, a pinch, and the like) to at least a part of the screen area displayed on the display 110. The touch input may be one of a touch input received while a user input for resizing the screen area is maintained, a touch input received within a predetermined period of time (e.g., 1 to 3 seconds) before the user input, and a touch input received within a predetermined period of time (e.g., a 1 to 3 seconds) after the user input.

The electronic device 100 according to an embodiment may further include a memory (e.g., the memory 1630 of FIG. 16). The memory may store default information or priority information described in an embodiment.

The core element may be identified based on default information for each screen area size. The default information for each screen area size may be stored in advance, and the core element may be identified based on the default information for each screen area size. The default information for each screen area size may be stored in advance in a memory of the electronic device 100.

For example, the default information for each screen area size may include information associated with the size of the screen area, and information associated with a core element corresponding to the size of the screen area. The default information for each screen area size may further include information associated with a first window including the core element and an area (e.g., a second window) excluding the first window in the screen area.

For example, in the state in which the screen area is enlarged/reduced, if a core element is selected by a user, the processor 120 may match information associated with the current screen (identification information of the core element, size information of the first window including the core element in the enlarged/reduced screen area, or information associated with an area excluding the first window in the enlarged/reduced screen area) to the enlarged/reduced size of the screen area and may store the same.

Priority information that designates priority associated with at least some of a plurality of elements displayed in the screen area may be stored in advance. In this instance, the processor 120 may determine at least one element to be displayed in the resized screen area based on the size of the resized screen area, the core element, and the priority information. The priority information may be stored in advance in the memory of the electronic device 100.

For example, in the case of elements related to the first application (e.g., a music application), priority may be determined in order of a replay button (first priority), a music profile picture (second priority), a status bar (third priority), a stop button (fourth priority), and a pause button and a fast forward button (fifth priority). In this instance, if a user selects the replay button as a core element, one or more elements to be additionally displayed in a first window including the replay button may be determined based on priority.

Elements having low priorities may not be displayed in the screen area or may be displayed in a reduced or modified state, according to the size of the first window.

While a user input (e.g., a slide-in/out input or a roll-in/out input) for resizing the screen area is received, or while the screen area is resized according to a user input for resizing the screen area, a touch input may be received to a core element in the screen area or to an area corresponding to the core element. The screen area may be resized according to the user input. The core element may be identified (selected) according to the touch input.

As the screen area is enlarged/reduced, the size of the window including the core element may be changed. The size of the window including the core element may be fixed based on releasing of a touch input from the core element or releasing of a touch input from an area corresponding to the core element. In the state in which the touch input is released and the size of the window including the core element is fixed, if a user input for resizing the screen area is maintained, the screen area may be enlarged/reduced, irrespective of the window in the fixed size.

Figure 2:
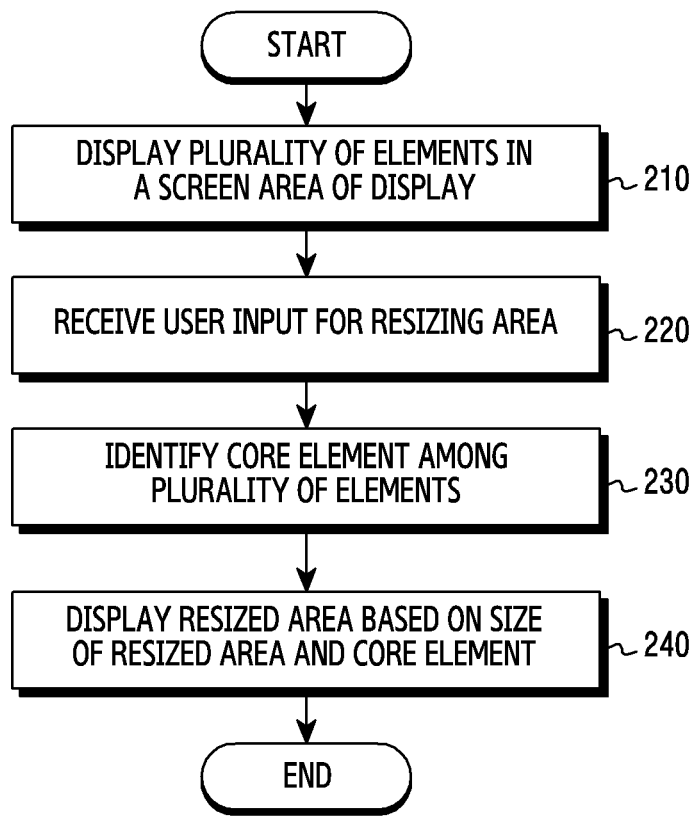
FIG. 2 is a flowchart illustrating a screen control method of an electronic device according to an embodiment.

FIG. 2 is a flowchart illustrating a screen control method of an electronic device according to an embodiment.

The screen control method in FIG. 2 may be performed by an electronic device (e.g., the electronic device 100 or the processor 120 of FIG. 1). For ease of description, it is assumed that each operation is performed as controlled by the processor 120 of FIG. 1. The processor 120 may be configured to perform at least some of the operations of the screen control method according to an embodiment. According to certain embodiments, at least one of operations 210 to 240 may be omitted, or some operations may be performed in a different order, or another operation may be further added.

Referring to FIG. 2, the screen control method according to an embodiment may include operations 210 to 240.

In operation 210, the processor 120 may display a plurality of elements on a screen area of the display 110 (e.g., a current display area based on a physical configuration of the display). For example, the plurality of elements may be graphic elements (or UI/UX elements or visible elements) related to a first application or a second application. Each of the plurality of elements may include at least one object.

In operation 220, the processor 120 may receive a user input requesting resizing (e.g., enlarging or reducing) of the screen area of the display 110. For example, the user input may be, according to a type of the display, one of a roll-out input for enlarging the size of a screen area, a roll-in input for reducing the size of a screen area, a slide-out input for enlarging the size of a screen area, a slide-in input for reducing the size of a screen area, and a touch input (e.g., a spread or a pinch) for enlarging or reducing the size of a window displayed in a screen area.

In operation 230, the processor 120 may identify a core element among the plurality of elements displayed in the screen area of the display 110.

The core element may be identified based on a touch input to at least a part of the screen area.

The touch input may be one of a touch input received while the user input is maintained, a touch input received within a predetermined period of time (e.g., 1 second) before the user input, and a touch input received within a predetermined period of time (e.g., 1 second) after the user input.

The core element may be identified based on default information for each screen area size. The default information for each screen area size may be stored (or set) in advance by a user. The screen control method according to an embodiment may further include an operation of storing default information for each screen area size.

Priority information that designates priority associated with at least some of the plurality of elements displayed in the screen area of the display 110 may be stored in advance. In this instance, the processor 120 may determine at least one element to be displayed in the resized screen area based on the size of the resized screen area of the display 110, the core element, and the priority information. For example, the at least one element may be one or more elements selected among the core element and elements displayed close thereto, based on the size of the resized screen area and the priority information. The screen control method according to an embodiment may further include an operation of storing priority information that designates priority associated with at least some of the plurality of elements displayed in the screen area. In operation 240, the processor 120 may display the resized screen area based on the size of the resized screen area of the display 110 and the core element. In the resized screen area, the window including the core element may be displayed in a size in accordance with the size of the resized screen area.

In the resized (enlarged/reduced) screen area, displaying of the core element may be maintained. Displaying of the core element may be maintained, irrespective of a change in the size of the screen area (or independently from a change in the size). The size or the form of displaying the core element or the window including the core element may be changed in accordance with a change in the size of the screen area.

For example, a first application (e.g., a music application) may be displayed in a first form (e.g., a full screen or one of multiple windows) in the screen area before resizing. If the screen area is enlarged/reduced, a core element selected by a touch input by a user (e.g., a tap and hold) may be activated and may be displayed in a second form (e.g., a mini-cropped window).

The size of the window including the core element may be changed (e.g., enlarged or reduced) in accordance with the size of the screen area.

For example, as the size of the screen area is enlarged, the size of the window including the core element may be displayed by being gradually reduced (or enlarged). As the size of the screen area is reduced, the size of the window including the core element may be displayed by being gradually enlarged (or reduced).

While a user input for resizing the screen area is received, or while the screen area is resized (e.g., enlarged or reduced) according to a user input, a touch input may be received to a core element in the screen area or to an area corresponding to the core element. The processor 120 may identify the core element based on a touch input to the core element or an area corresponding to the core element.

Figure 3A:
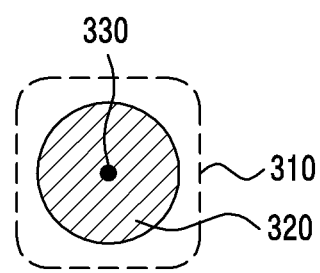
FIG. 3A is a diagram illustrating an example of a screen of an electronic device according to an embodiment.
Figure 3B:
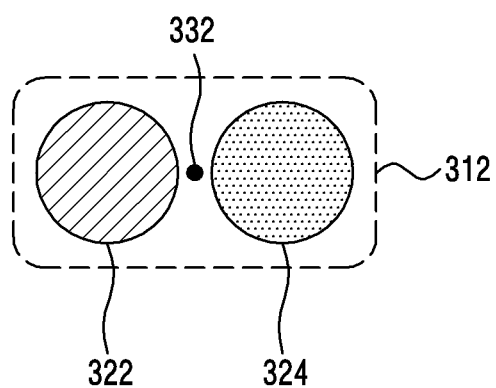
FIG. 3B is a diagram illustrating an example of a screen of an electronic device according to an embodiment.
Figure 3C:
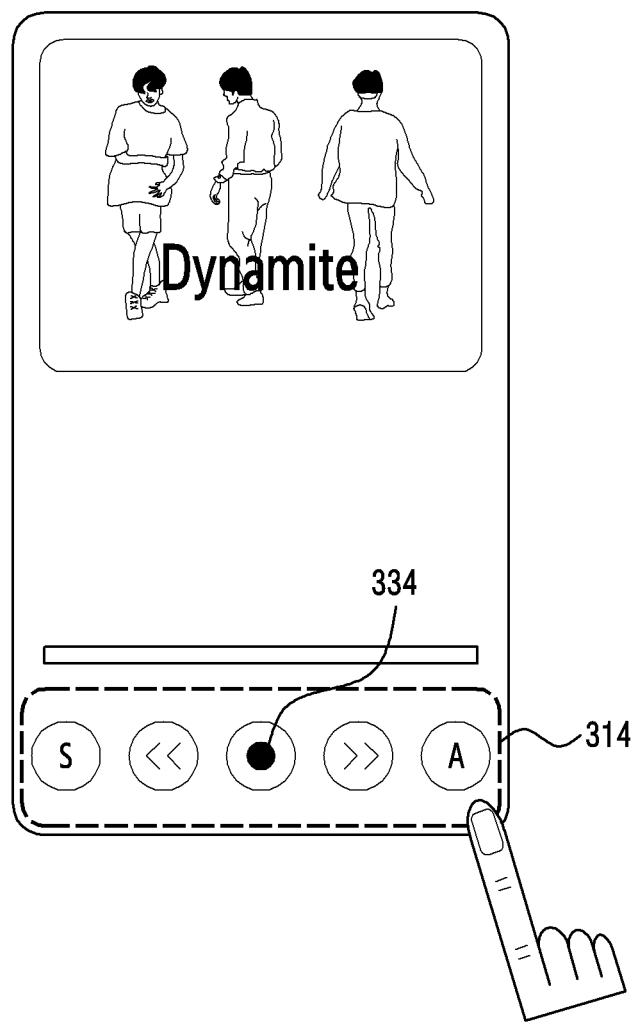
FIG. 3C is a diagram illustrating an example of a screen of an electronic device according to an embodiment.

While the screen area is resized, a touch input to at least a part of the screen area may be received or released. Based on releasing of the touch input, the size of the window including the core element may be fixed. FIG. 3A is a diagram illustrating an example of a screen of an electronic device according to an embodiment, and an operation (e.g., operation 230 of FIG. 2) of identifying a core element. FIG. 3B is a diagram illustrating an example of a screen of an electronic device according to an embodiment, and an operation (e.g., operation 230 of FIG. 2) of identifying a core element. FIG. 3C is a diagram illustrating an example of a screen of an electronic device according to an embodiment, and an operation (e.g., operation 230 of FIG. 2) of identifying a core element.

Reference numerals 310, 312, and 314 are examples of a selected area. Reference numerals 320, 322, and 324 are examples of an object. A reference numeral 330 is an example of the pivot 330 of a first object 320. A reference numeral 332 is an example of the pivot 332 of a selected area 312 including the first object 322 and the second object 324. A reference numeral 334 is an example of the pivot of the selected area 314 including a plurality of objects.

Referring to FIG. 3A, the processor 120 may identify a core element based on a touch input (e.g., a tap, a long tap, a tap and hold, and a press) to the first object 320 that is being displayed. For example, if a user taps and holds the first object 320 so as to select the first object 320 as a core element, the first object 320 or the first area 310 including the first object 320 may be selected as a core element. The processor 120 may identify the pivot 330 of the object or the area selected as the core element (e.g., as a graphic midpoint of the object or the area).

Referring to FIG. 3B, the processor 120 may identify a core element based on a touch input (e.g., a multi-touch) to the first object 322 and the second object 324. For example, if the user selects the first object 322 and the second object 324 using multiple touches, or if the user touches the central point between the first object 322 and the second object 324, the two objects 322 and 324 or the second area 312 including the two objects 322 and 324 may be selected as a core element. The processor 120 may identify the pivot 332 of the object or the area selected as the core element.

Referring to FIG. 3C, the processor 120 may identify a core element based on a touch input (e.g., multiple touches or area-defining selection, such as a spread) for selecting a predetermined area. For example, if the user selects the third area 314 including a plurality of objects by performing a multi-touch operation and/or a spreading operation on the third area 314, the plurality of objects included in the third area 314 or the third area 314 may be selected as a core element. The processor 120 may identify the pivot 334 of the plurality of objects or the area selected as the core element.

When a screen area is resized (e.g., enlarged or reduced), screen switching may be performed based on the core element (e.g., the area 310, 312, or 314) or the pivot of the core element (e.g., the pivot 330, 332, or 334). For example, if the screen area is enlarged or reduced, and one of the first area 310, the second area 312, and the third area 314 is selected as a core element, the enlarged or reduced screen area may be displayed based on the pivot of the selected core element (e.g., the pivot 330 of the first area 310, the pivot 332 of the second area 312, and the pivot 334 of the third area 314). The size of a window including the area identified as the core element (e.g., the first area 310, the second area 312, and the third area 314) in the enlarged/reduced screen area may be changed in accordance with the size of the screen area.

Figure 4:
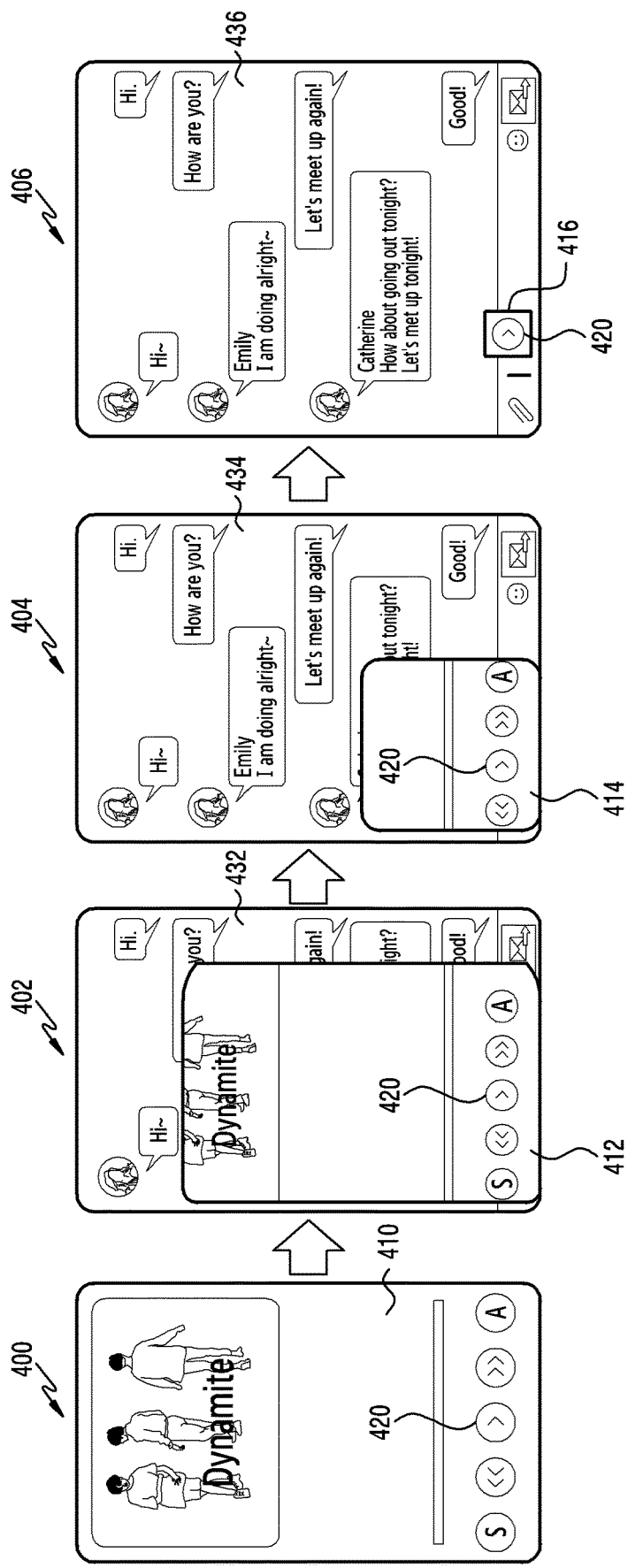
FIGS. 4 to 13 are diagrams illustrating examples of a screen of an electronic device which has a variable form factor according to an embodiment.

FIG. 4 is a diagram illustrating an example of a screen of an electronic device according to an embodiment. FIG. 4 illustrates an example in which a screen area is enlarged, in a state in which a replay button 420 of a first application (e.g., a music application) is touched.

In the case of enlargement, the size of the screen area may be enlarged in order of a first screen area 400, a second screen area 402, a third screen area 404, and a fourth screen area 406.

The reference numeral 400 is an example of the screen area before enlargement. Reference numerals 402 and 404 are examples of the screen area while the screen area is being enlarged. The reference numeral 406 is an example of the screen area of which enlargement is complete.

The replay button 420 may be an example of a core element selected by a user. Reference numerals 410, 412, 414, and 416 are examples of a first window including the core element. For example, at least one element (e.g., an object) related to the first application (e.g., a music application or a foreground application) may be displayed in the first window 410, 412, 414, and 416. At least one element (e.g., an object) related to a second application (e.g., a chatting application, a launcher application, and a background application) may be displayed in a second window 432, 434, and 436.

In the case of reduction, unlike the enlargement, the size of the screen area may be reduced, in example reverse order of the fourth screen area 406, the third screen area 404, the second screen area 402, and the first screen area 400.

A plurality of elements may be displayed in the screen area. For example, the first window 410 may be displayed in the first screen area 400. A plurality of elements related to the first application (e.g., a music application) may be displayed in the first window 410. The first window 416 and the second window 436 may be displayed in the fourth screen area 406. The replay button 420 which is a core element related to the first application (e.g., a music application) may be displayed in the first window 416. Elements related to the second application (e.g., a chatting application) may be displayed in the second window 436.

In the state in which the plurality of elements is being displayed in the screen area, a user input (e.g., a roll-out input or a slide-out input) for enlarging the size of the screen area may be received.

As the modification state (e.g., a rolling state or a sliding state) of the display 110 is changed by the user input, the screen area may be gradually enlarged (in order of the screen areas 400, 402, 404, and 406).

While the user input is received or while the screen area is resized by the user input, a user touch input to the replay button 420 or an area corresponding to the replay button 420 may be received. According to the user touch input to the replay button 420, the replay button 420 may be identified (selected) as a core element among the elements displayed in the screen area.

While the user input is received or while the screen area is resized by the user input, the screen area that is gradually enlarged may be displayed based on the replay button 420 or the area corresponding to the replay button 420 which is the core element.

The size of the first window 410, 412, 414, and 416 including the replay button 420 which is the core element may be changed (e.g., enlarged or reduced) in accordance with the enlarged size of the screen area. For example, in the case of reduction, the size of the first window 410, 412, 414, and 416 may be in inverse proportion to the size of the screen area (e.g., and vice-versa for a case of enlargement). For example, as illustrated in the drawing, as the size of the screen area is enlarged, the first window 410, 412, 414, and 416 may be displayed by being gradually reduced. For example, the size of the first window 410, 412, 414, and 416 may change, inversely proportional to the increase in size of the screen area. In this instance, as the size of the screen area is enlarged, the size of the first window 410, 412, 414, and 416 may also be gradually enlarged.

As described above, the screen area which is enlarged based on the core element may be displayed, and the size of the window including the core element may be associated with the size of the screen area.

Accordingly, a user-centered intuitive UI/UX which reflects a user demand and context may be embodied.

For example, when the screen area is enlarged, the user suspends using the first application (e.g., a music application) currently used, and may desire to interact with the second application (e.g., a chatting application) which was previously in the foreground. In this instance, an effective UI/UX appropriate for a user demand may be provided by reducing a first application area which is being used and enlarging and displaying a second application area.

For example, it is assumed that a user performs a slide-out operation in the state of touching a replay button, and when a plurality of elements (e.g., many objects corresponding to a replay button and a music application) related to the first application (e.g., a music application) are displayed. In this instance, the desire of the user may be to enlarge the overall screen area, leaving the replay button 420 when the screen area is enlarged, and interacting primarily with the second application (e.g., a chatting application).

As illustrated in the drawing, the processor 120 may identify the replay button 420, which is touched by a user, as the core element, maintain display of the replay button 420, and transition through the sequence illustrated via the first windows 410, 412, 414, and 416 (e.g., the reduction of the first application area) including maintaining the replay button 420 by gradually reducing the size thereof, in accordance with the enlargement of the size of the screen area.

In the screen area where enlargement is complete, the replay button 420, which is the core element, may remain displayed in an activated state. The processor 120 may maintain display of the replay button 420 which is the core element, and may transition through the sequences for the second window 432, 434, and 436 (e.g., the enlargement of the second application area) by gradually enlarging the size thereof in accordance with the enlargement of the size of the screen area.

For example, in the first window 412, 414, and 416 (e.g., the first application area) including the replay button 420 which is the core element in the enlarged screen area, while displaying of the replay button 420 is maintained, elements adjacent to the replay button 420 (e.g., elements related to the first application) may be gradually reduced or disappear. In the second window 432, 434, and 436 (e.g., the second application area) in the enlarged screen area, a plurality of elements (e.g., elements related to the second application) may be gradually enlarged or appear.

FIG. 4 is a diagram illustrating the example in which a screen area is enlarged, and the size of a window including a core element is gradually reduced when the screen area is enlarged.

In the same manner, there may be an embodiment in which a screen area is reduced, and the size of a window including a core element is gradually enlarged when the screen area is reduced.

A user may perform a slide-in operation in the state in which the extended screen area is being displayed. In this instance, the user demand may desire reducing the overall screen area, and returning to the execution screen of the first application related to the replay button 420 that remains as the core element when the screen area is reduced.

Accordingly, the size of the screen area may be gradually reduced in order of reference numerals 406, 404, 402, and 400. In the reduced screen area, displaying of the replay button 420 which is the core element is maintained, and the size of the first window 416, 414, 412, and 410 including the replay button 420 may be gradually enlarged.

For example, when the size of the screen area is reduced, the first window 416, 414, 412, and 410 (e.g., the first application area) including the replay button 420 which is the core element in the reduced screen is gradually enlarged in accordance with the reduction of the screen area, and the elements adjacent to the replay button 420 (e.g., elements related to the first application) may be gradually enlarged or appear in the first window 416, 414, 412, and 410. The second window 436, 434, and 432 (e.g., the second application area) in the reduced screen area may be gradually reduced, and a plurality of elements (e.g., elements related to the second application) may be gradually reduced or disappear in the second window 436, 434, and 432.

Figure 5:
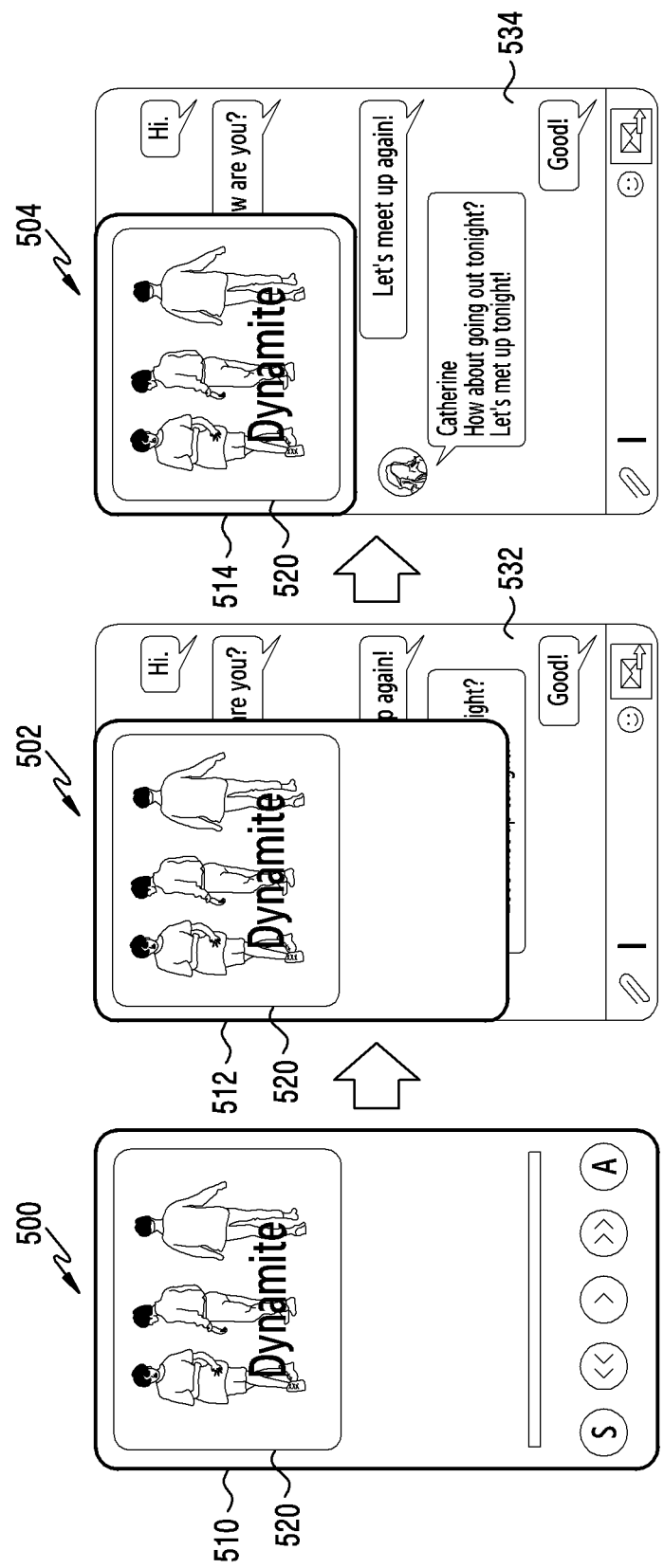

FIG. 5 is a diagram illustrating an example of a screen of an electronic device according to an embodiment. FIG. 5 illustrates the example in which a screen area is enlarged in the state in which a music profile picture 520 of a first application (e.g., a music application) is touched.

In this case of enlargement, the screen area may be enlarged in order of reference numerals 500, 502, and 504.

The reference numeral 500 is an example of the screen area before enlargement. The reference numeral 502 is an example of the screen area in the state of being enlarged. The reference numeral 504 is an example of the screen area of which enlargement is complete.

The music profile picture (e.g., "Dynamite") of the reference numeral 520 is an example of a core element selected by a user. Reference numerals 510, 512, and 514 are examples of a first window including the core element. For example, elements (e.g., objects) related to the first application (e.g., a music application or a foreground application) may be displayed in the first window 510, 512, and 514. Elements (e.g., objects) related to a second application (e.g., a chatting application, a launcher application, and a background application) may be displayed in a second window 532 and 534.

As the size of the overall screen area is gradually enlarged, the size of the first window 510, 512, and 514 including the music profile picture 520 which is the core element may be gradually reduced.

As the size of the screen area is enlarged, displaying of the music profile picture 520 which is the core element is maintained in the first window 510, 512, and 514 in the enlarged screen area, and elements adjacent to the music profile picture 520 (e.g., objects of the music application) but within the same window may be gradually reduced in size, and/or eventually disappearing (e.g., as in 504). In the case of enlargement, the music profile picture 520 may remain in an activated state in the first window 510, 512, and 514. As the size of the screen area is enlarged, a plurality of elements (e.g., objects of a chatting application) may be gradually enlarged or appear in the second window 532 and 534 in the enlarged screen area.

In the case of reduction, the screen area may be reduced in order of reference numerals 504, 502, and 500.

As the size of the overall screen area is gradually reduced, the size of the first window 514, 512, and 510 including the music profile picture 520 which is the core element may be gradually enlarged and displayed.

As the size of the screen area is reduced, display of the music profile picture 520, which is the core element, may be maintained in the first window 514, 512, and 510 in the reduced screen area, and elements adjacent to the music profile picture 520 (e.g., objects of the music application) may be gradually enlarged or newly displayed as to now appear.

In the case of reduction, the music profile picture 520 may remain in an activated state in the first window 514, 512, and 510. As the size of the screen area is reduced, a plurality of elements (e.g., objects of a chatting application) may be gradually reduced and/or eventually removed from display in the second window 534 and 532 in the reduced screen area.

Figure 6:
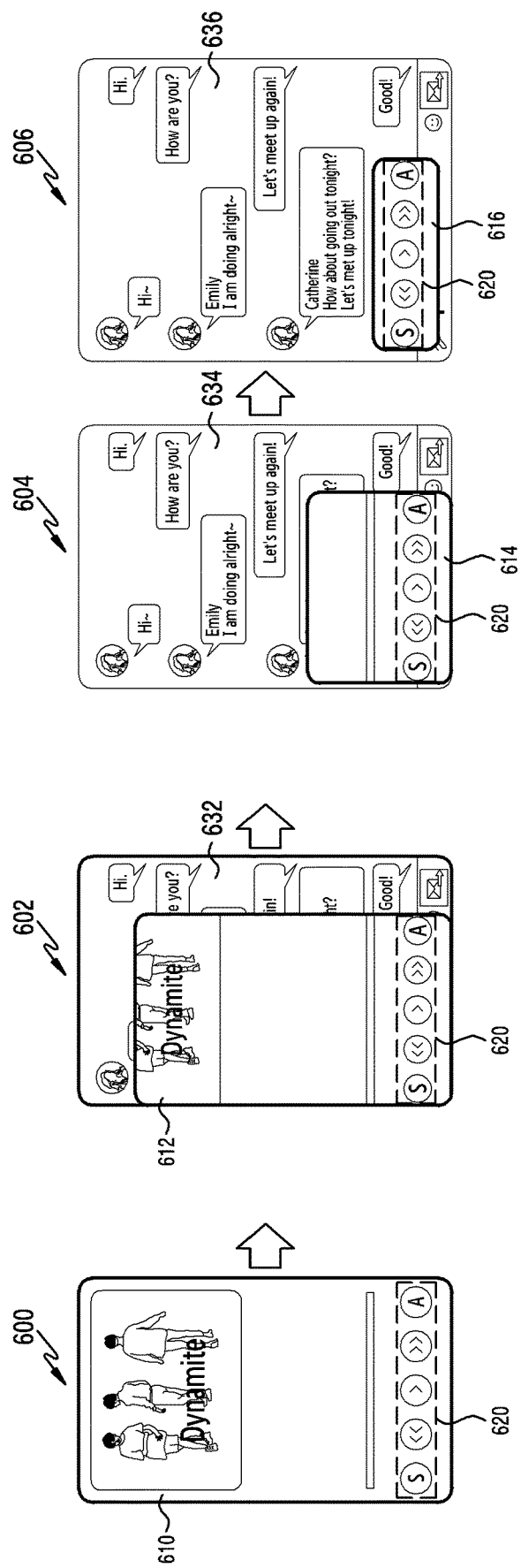

FIG. 6 is a diagram illustrating an example of an electronic device according to an embodiment. FIG. 6 illustrates an example in which a screen area is enlarged in the state in which a button area 620 of a first application (e.g., a music application) is selected.

In the case of enlargement, the screen area may be enlarged as exemplified in the example illustrative order of reference numerals 600, 602, 604, and 606.

A reference numeral 600 may be an example of the screen area before enlargement. Reference numerals 602 and 604 may be examples of the screen area in the state of being enlarged. The reference numeral 606 may be an example of the screen area of which enlargement is complete.

A button area of the reference numeral 620 is an example of a core element 620 identified via selection by a user. Reference numerals 610, 612, 614, and 616 are examples of a first window including the core element 620.

As the size of the screen area is gradually enlarged, the size of the first window 610, 612, 614, and 616 including the core element 620 including the button area may be gradually reduced and displayed. In the first window 610, 612, 614, and 616, in the enlarged screen area, display of the button area 620 (which is the core element) is maintained, and elements adjacent to the button area 620 (e.g., objects of a music application) may be gradually reduced in size and/or eventually disappear as to be removed from display. In the case of enlargement, the button area 620 may remain in an activated state in the first window 610, 612, 614, and 616. When the size of the screen area is enlarged, a plurality of elements (e.g., objects of a chatting application) may be gradually enlarged in size or newly displayed as to first appear in the second window 632, 634, and 636 in the enlarged screen area.

In the case of reduction, the screen area may be reduced in an example display order of reference numerals 606, 604, 602, and 600.

As the size of the screen area is gradually reduced, the size of the first window 610, 612, 614, and 616 including the button area 620 (which is the core element) may be gradually enlarged and displayed.

As the size of the screen area is reduced, display of the button area 620 (which is the core element) may be maintained in the first window 610, 612, 614, and 616 in the reduced screen area, and elements adjacent to the music profile picture 520 (e.g., objects of the music application) may be gradually enlarged in size and/or newly displayed as to first appear. In the case of reduction, the button area 620 may remain in an activated state in the first window 610, 612, 614, and 616. As the size of the screen area is reduced, a plurality of elements (e.g., objects of a chatting application) may be gradually reduced in size and/or be removed from display as to disappear in the second window 632, 634, and 636 in the reduced screen area.

Figure 7:
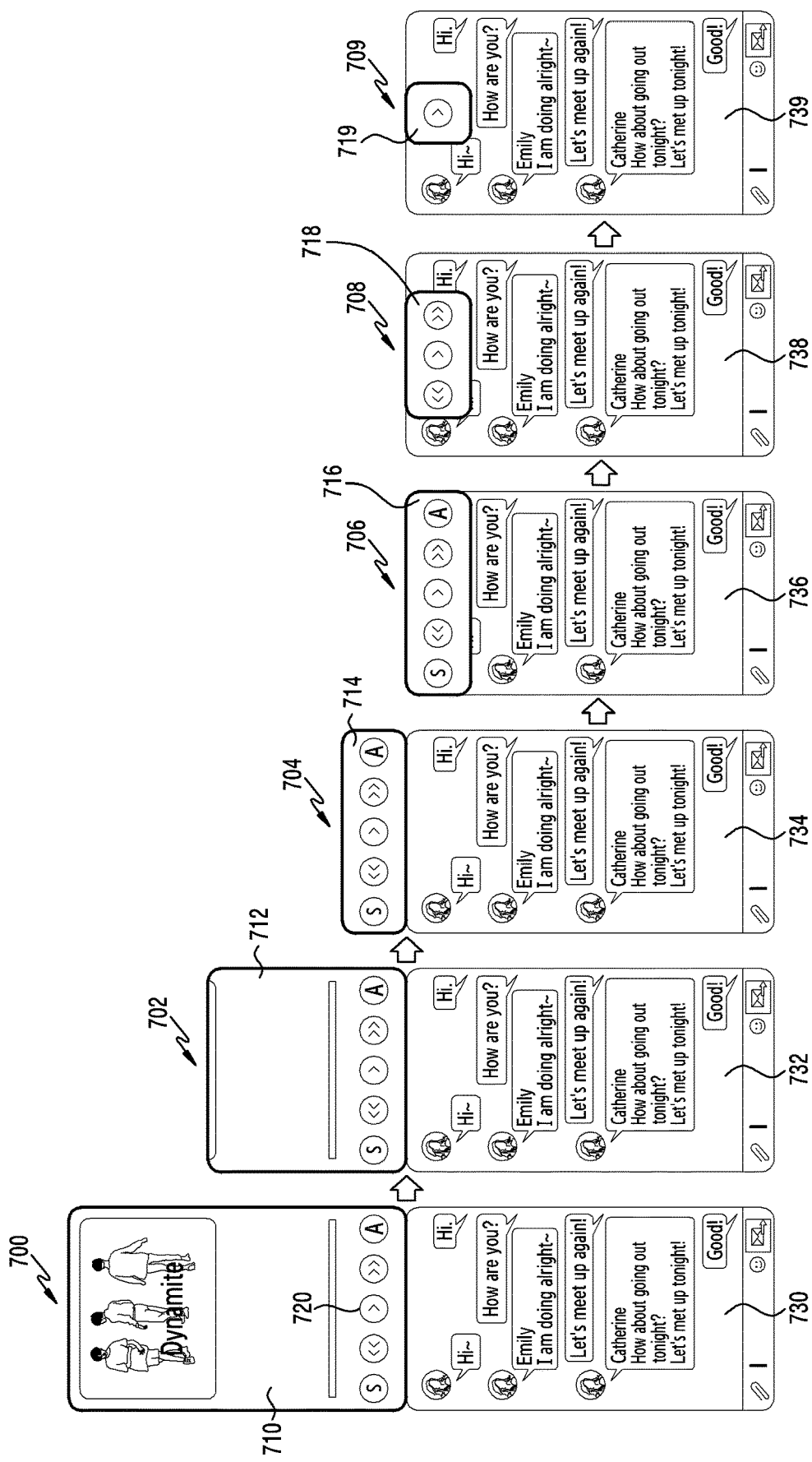

FIG. 7 is a diagram illustrating an example of a screen of an electronic device according to an embodiment.

The display 110 of the electronic device 100 of FIG. 7 may be a vertical rollable type of display which has a variable form factor. The screen area may be an area (e.g., full screen) of the display 110 which is exposed visually and substantially through the foreside (e.g., frontal portion) of the electronic device, and may be enlarged or reduced in a vertical direction according to a user input (e.g., a vertical roll-in/roll-out input). Multiple windows 710 and 730 may be displayed on the display 110.

FIG. 7 illustrates the example in which the screen area is reduced in the vertical direction according to a user input (e.g., a roll-in input) in the state in which a replay button 720 of a first application (e.g., a music application) is selected by a touch input of a user.

In the case of reduction, the screen area may be reduced in the example illustrative order of reference numerals 700, 702, 704, 706, 708, and 709.

The reference numeral 700 is an example of the screen area before reduction. Reference numerals 702, 704, 706, and 708 may be examples of the screen area in the state of being reduced. The reference numeral 709 is an example of the screen area of which reduction is complete.

The replay button 720 is an example of a core element selected by a user. Reference numerals 710, 712, 714, 716, 718, and 719 are examples of a first window including the core element. Reference numerals 730, 732, 734, 738, and 739 may be examples of a second window. Elements related to the first application (e.g., a music application) may be displayed in the first window 710, 712, 714, 716, 718, and 719. Elements related to a second application (e.g., a chatting application) may be displayed in the second window 730, 732, 734, 738, and 739.

As the size of the screen area is gradually reduced, the size of the first window 710, 712, 714, 716, 718, and 719 including the replay button 720 (which is the core element) may be gradually reduced even as it is maintained in display. In the first window 710, 712, 714, 716, 718, and 719, displaying of the replay button 720 (which is the core element) is maintained, and elements adjacent to the replay button 720 (e.g., objects of a music application) may be gradually reduced in size and/or removed from display as to disappear. In the case of reduction, the replay button 720 may remain in an activated state in the first window 710, 712, 714, 716, 718, and 719. Irrespective of reduction of the size of the screen area, the actual size of the second window 730, 732, 734, 738, and 739 may be maintained without alteration. When the reduction is complete, the first window 719 including the replay button 720 (e.g., as to exclude other elements) which is the core element may remain as a floating window 719 in the screen area. A user may be capable of requesting a core function (e.g., an executable function associated with selection of the core element) using the replay button 720 which is the core element, irrespective of enlargement/reduction of the screen area.

In the case of enlargement, the screen area may be enlarged in the opposite example illustrative order of reference numerals 709, 708, 706, 704, 702, and 700.

As the size of the screen area is gradually enlarged, the size of the first window 719, 718, 716, 714, 712, and 710 including the replay button 720 (which is the core element) may be gradually enlarged and displayed. In the enlarged first window 719, 718, 716, 714, 712, and 710, displaying of the replay button 720 (which is the core element) is maintained, and elements adjacent to the replay button 720 (e.g., objects of a music application) may be gradually enlarged in size and/or newly displayed as to appear. In the case of enlargement, the replay button 720 may remain in an activated state in the first window 719, 718, 716, 714, 712, and 710. Irrespective of enlargement of the size of the screen area, the size of the second window 739, 738, 736, 734, 732, and 730 may be maintained without alteration.

Figure 8:
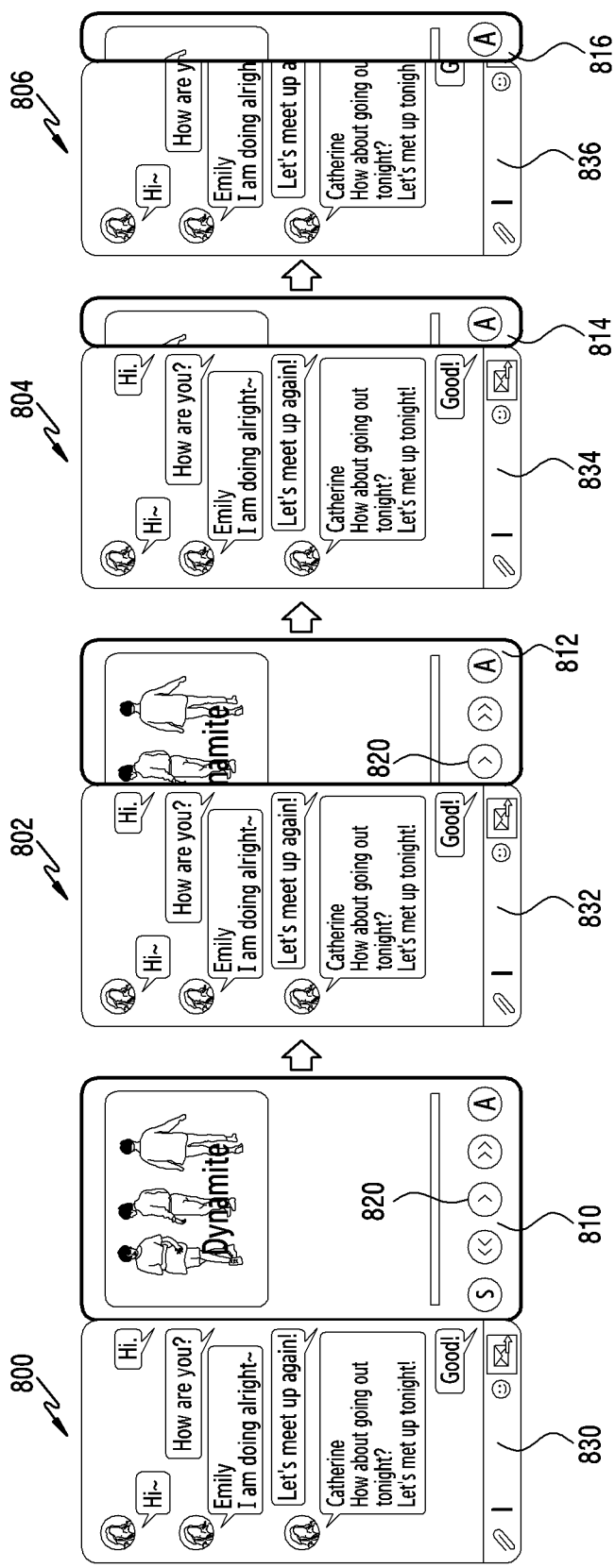

FIG. 8 is a diagram illustrating an example of a screen of an electronic device according to an embodiment.

The display 110 of the electronic device 100 of FIG. 8 may be a horizontal rollable type of display which has a variable form factor. A screen area may be an area (e.g., full screen) of the display 110, which is exposed visually and substantially through the foreside of the electronic device, and may be enlarged or reduced in the horizontal direction according to a user input (e.g., a horizontal roll-in/roll-out input). Multiple windows 810 and 830 may be displayed in the display 110.

FIG. 8 illustrates the example in which a screen area is reduced in the horizontal direction in the state in which a replay button 820 of a first application (e.g., a music application) is selected by a touch input of a user.

In the case of reduction, the screen area may be reduced in the example illustrative order of reference numerals 800, 802, 804, and 806.

The reference numeral 800 is an example of the screen area before reduction. Reference numerals 802 and 804 are examples of the screen area in the state of being reduced. The reference numeral 806 is an example of the screen area of which enlargement is complete.

The replay button 820 is an example of a core element selected by a user. Reference numerals 810, 812, 814, and 816 are examples of a first window including the core element. Reference numerals 830, 832, 834, and 836 are examples of a second window. Elements related to the first application (e.g., a music application) may be displayed in the first window 810, 812, 814, and 816. Elements related to a second application (e.g., a chatting application) may be displayed in the second window 830, 832, 834, and 836.

As the size of the screen area is gradually reduced, the size of the first window 810, 812, 814, and 816 including the replay button 820 which is the core element may be gradually reduced but nevertheless maintained in display. In the case of reduction, in the first window 810, 812, 814, and 816, displaying of the replay button 820 (which is the core element) may be maintained, and elements adjacent to the replay button 820 (e.g., objects of a music application) in the same first window 810, 812, 814, 816 may be gradually reduced in size and/or removed from display as to disappear. In the case of reduction, the replay button 820 may remain in an activated state in the first window 810, 812, 814, and 816.

If the size of the screen area is greater than the size of the second window (e.g., the screen area 800, 802, or 804), the size of the second window 830, 832, and 834 may be maintained without alteration irrespective of reduction of the size of the screen area. If the size of the screen area is reduced to be less than or equal to the size of the second window (e.g., the screen area 806), the reduced first window 816 may be displayed in an overlapping state (e.g., a mini-cropped window, as in 816) alongside the second window 836.

When the size reduction is complete, the reduced first window 816 including the replay button 820 (which is the core element) may remain in a mini-cropped state in the screen area (e.g., as in reference numeral 816). A user may remain capable of executing a core function by selecting the replay button 820 which is the core element, irrespective of the enlarging/reducing of the screen area.

In another interpretation of FIG. 8, in the case of enlargement, the screen area may be enlarged in the opposite example order of reference numerals 806, 804, 802, and 800.

As the size of the screen area is gradually enlarged, the size of the first window 816, 814, 812, and 810 including the replay button 820 which is the core element may be gradually enlarged. In the case of enlargement, in the first window 816, 814, 812, and 810, displaying of the replay button 820 (which is the core element) may be maintained, and elements adjacent to the replay button 820 (e.g., objects of a music application) within the same first window 816, 814, 812, 810 may be gradually enlarged in size or newly displayed as to first appear. In the case of enlargement, the replay button 820 may remain in an activated state in the first window 816, 814, 812, and 810. If the size of the screen area is greater than the size of the second window (e.g., the screen area 804, 802, or 800), the size of the first window 816, 814, 812 and 810 may be gradually enlarged, and the size of the second window 834, 832, and 830 may be maintained without alteration irrespective of enlargement of the size of the screen area.

Figure 9:
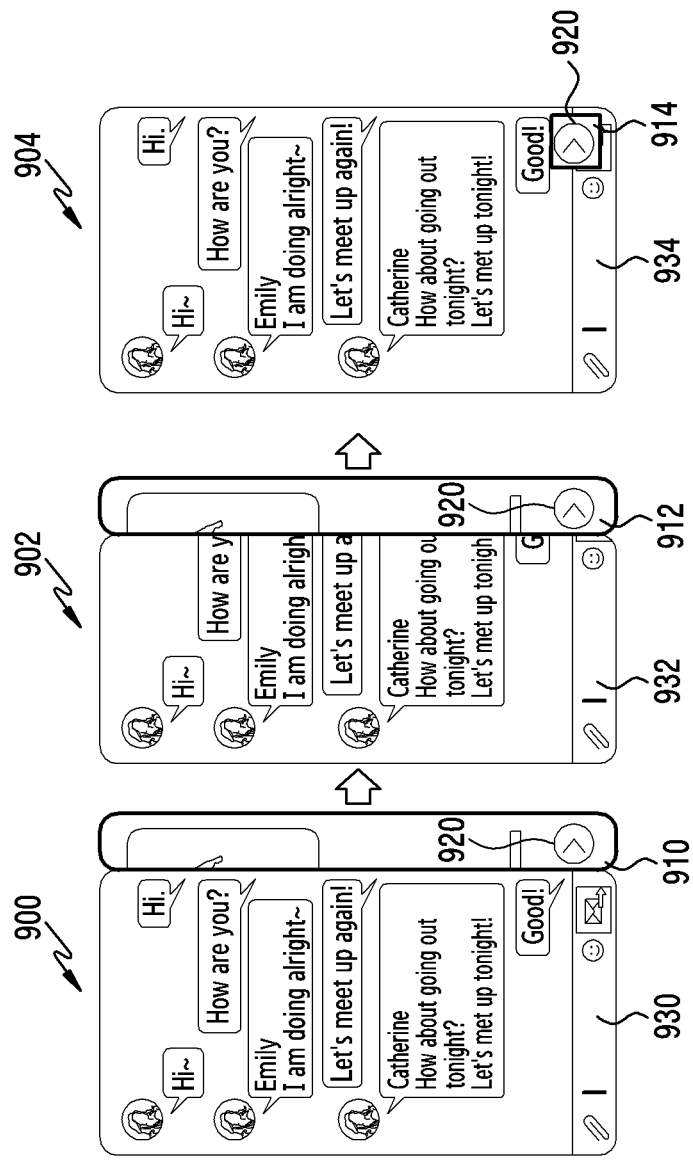

FIG. 9 is a diagram illustrating an example of a screen of an electronic device according to an embodiment.

The display 110 of the electronic device 100 of FIG. 9 may be a horizontal rollable type of display which has a variable form factor. Multiple window 930 and 910 may be displayed in a screen area of the display 110 before reduction. FIG. 9 illustrates the example in which the screen area is reduced in the horizontal direction in the state in which a replay button 920 of a first application (e.g., a music application) is selected by a touch input of a user, and designated thus as the core element.

In the example of FIG. 9, elements related to a first application (e.g., a music application) may be included in a first window 910, 912, and 914 that is displayed in a mini-cropped state or a floating state. Elements related to a second application (e.g., a chatting application) may be displayed in a second window 930, 932, and 934.

In the case of reduction, the screen area may be reduced in the example illustrative order of reference numerals 900, 902, and 904.

The reference numeral 900 is an example of the screen area before reduction. The reference numeral 902 is an example of the screen area in the state of being reduced. The reference numeral 904 is an example of the screen area of which reduction is complete.

If the size of the screen area is reduced to the size of the second window 930, 932, and 934, the first window 910 and 912 which has been displayed in a mini-cropped state may be changed to the first window 914 in a floating state, in accordance with the reduction of the size of the screen area.

Accordingly, the first window 914 may be reduced to the minimum size including the replay button 920 (e.g., as to exclude other elements), and a user may freely use the second application (e.g., a chatting application) via the second window 930, 932, and 934. The first window 914 in the floating state may be moved to another location according to a user touch input.

In the case of enlargement, the screen area may be enlarged in the example illustrative order of reference numerals 904, 902, and 900.

Figure 10:
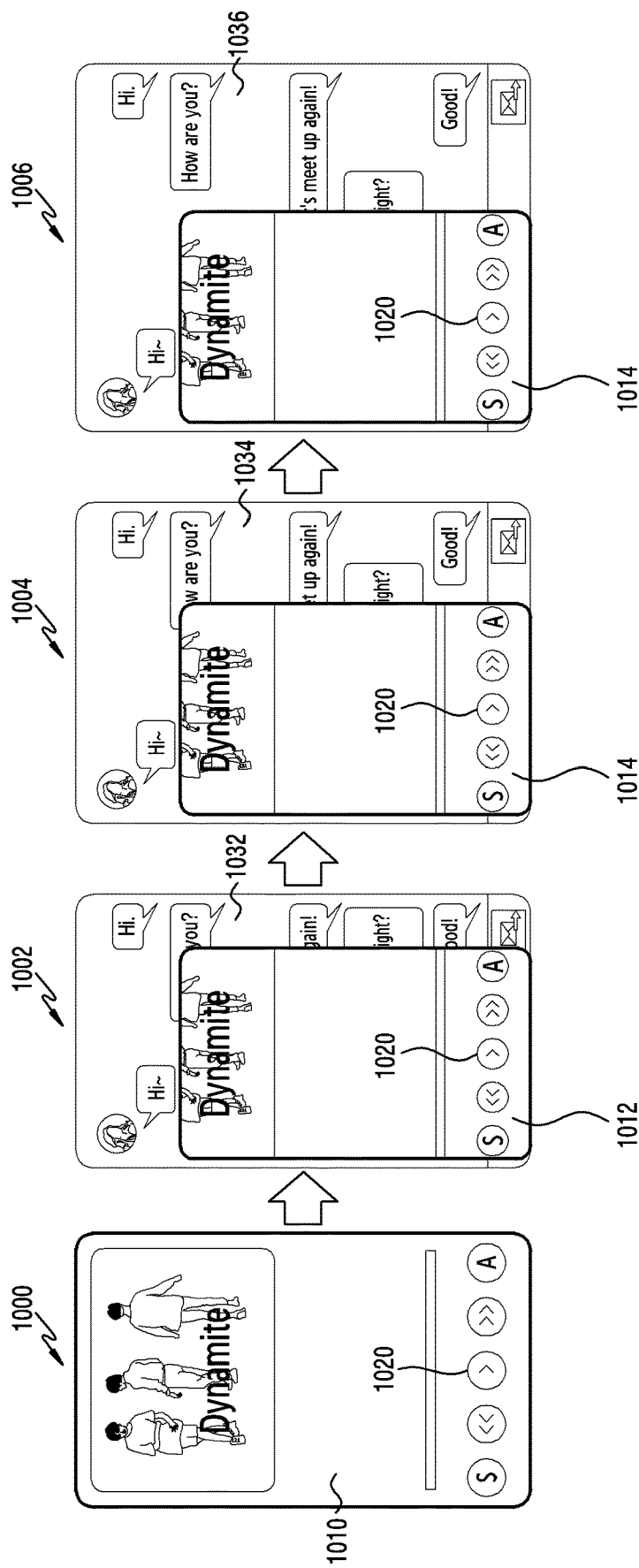

FIG. 10 is a diagram illustrating an example of a screen of an electronic device according to an embodiment.

FIG. 10 illustrates the example in which the screen area is enlarged in the horizontal direction in the state in which a replay button 1020 of a first application (e.g., a music application) is selected by a touch input of a user as a core element.

In the case of enlargement, the screen area may be enlarged in the example illustrative order of reference numerals 1000, 1002, 1004, and 1006.

A reference numeral 1000 is an example of the screen area before enlargement. Reference numerals 1002 and 1004 are examples of the screen area in the state of being enlarged. The reference numeral 1006 is an example of the screen area of which enlargement is complete.

The size of the screen area may be gradually enlarged according to a user input (e.g., a horizontal roll-out input).

When the screen area is enlarged, the replay button 1020 may be identified as a core element based on a user touch input to the replay button 1020.

As illustrated in the drawing, the size of a first window 1010, 1012, and 1014 (e.g., a music application area) including the replay button 1020 (which is the core element) and the size of a second window 1032, 1034, and 1036 (e.g., a chatting application area) may vary according to the enlargement of the screen area.

While the screen area is enlarged, a touch input to at least a part of the screen area may be received or released. Based on detecting release of the touch input, the size of the first window 1014 including the replay button 1020 (which is the core element) may be set.

For example, if the size of the screen area is enlarged by a user input (e.g., a roll-out input) in the state in which a user touches the replay button 1020, the size of the first window 1010, 1012, and 1014 may be reduced in accordance with the size of the screen area. According to a touch input to the replay button 1020, the replay button 1020 may be identified as the core element. The screen area is enlarged may include continuous display of the replay button 1020 (that is the core element). The size of the first window 1010, 1012, and 1014 including the replay button 1020 (that is the core element) may be gradually reduced in accordance (e.g., proportion) with the size of the enlarged screen area.

Based on releasing of the touch input, the size of the first window 1014 including the replay button 1020 that is the core element may be fixed.

Reference numerals 1004 and 1006 may be examples of the screen area in the state in which the size of the first window 1004 is fixed (e.g., after release of the touch input).

For example, a user performs a roll-out operation in the state of touching the replay button 1020 with a finger, and may enlarge the screen area of the display 110. If the user removes the finger and thus releases the touch input from the replay button 1020 while enlarging the screen area, the size (and display state) of the first window 1014 (e.g., a music application window) may be set at the size in which it was displayed at the time in which the touch is released. Subsequently, although the user resumes enlargement of the screen area using the roll-out operation, the size and the display state of the first window 1014 may be maintained as it is (e.g., without further reduction), irrespective of the enlargement of the screen area (i.e., as in enlargement illustrated from reference numeral 1004 to reference numeral 1006).

Figure 11:
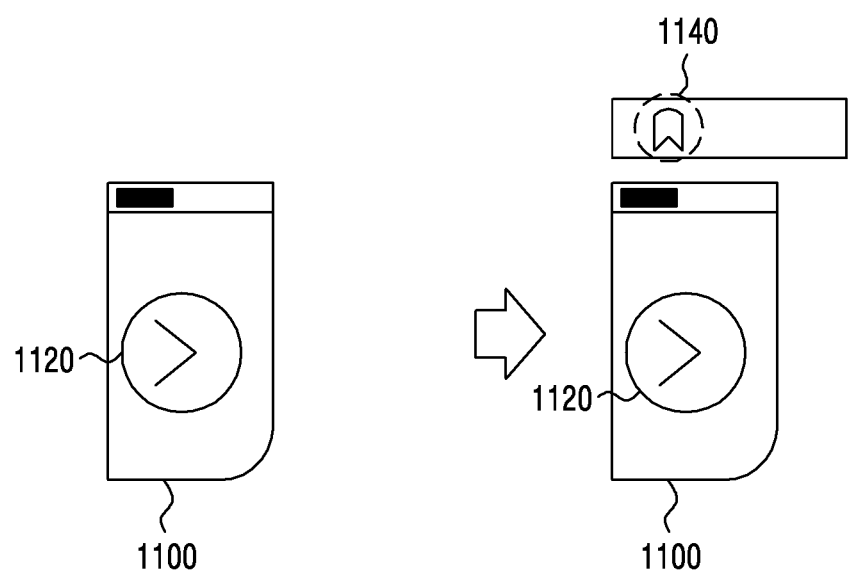

FIG. 11 is a diagram illustrating an example of a screen of an electronic device according to an embodiment.

If a replay button 1120 is selected as a core element based on a touch input by a user, default information associated with the core element selected by the user or a window 1100 including the core element may be stored.

For example, if a touch input (e.g., a long tap) selects the replay button 1120 in the reduced window 1100, the processor 120 may display a default setting icon 1140 for setting the reduced window 1100 as a default core element, proximate to the reduced window 1100 in response to the touch input.

If the default setting icon 1140 is selected by the user, information associated with the size (and displaying state) of the reduced window 1100 may be matched to the current size of the screen area, and may be stored as default information for each screen area size. The user may freely alter or change the default information via configuration (not illustrated) of the electronic device 100, and may store the same.

Figure 12:
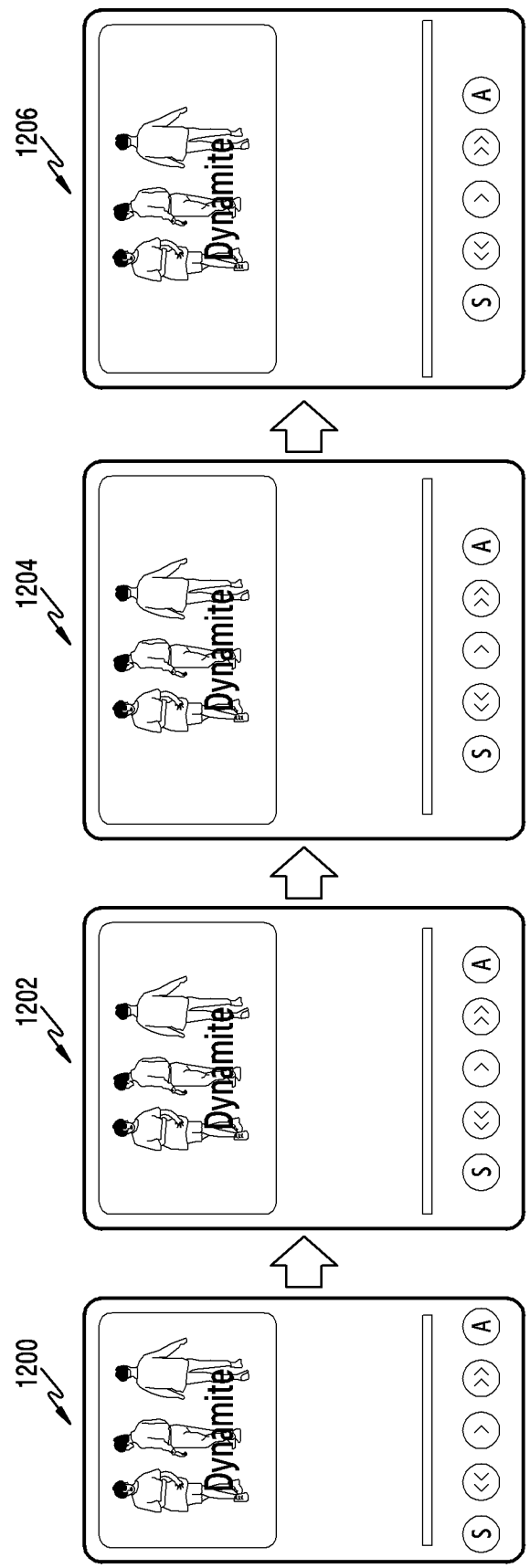
Figure 13:
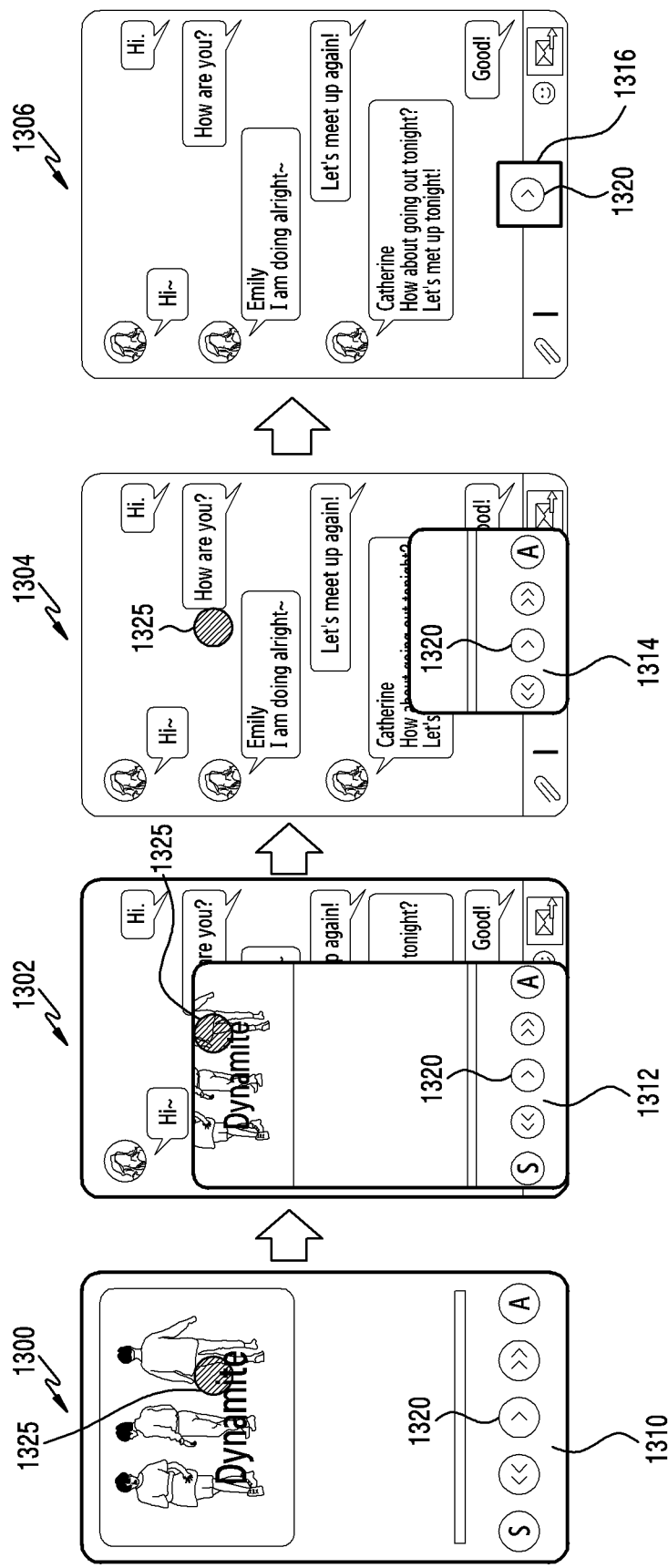

FIG. 12 is a diagram illustrating an example of a screen of an electronic device according to an embodiment. FIG. 13 is a diagram illustrating an example of a screen of an electronic device according to an embodiment.

Default information for each screen area size may be utilized in various ways.

For example, in the case of enlargement/reduction of the display 110, if a user does not select a core element separately, a predetermined operation (enlargement/reduction of a first window) may be performed. Referring to FIG. 12, as the display 110 is enlarged, a first window 1200, 1202, 1204, and 1206 which is displayed in the screen area of the display 110 may be gradually enlarged.

If a user set a core element or a window including the core element as a default core element in advance, and enlarges/reduces the display 110, the screen area of the display 110 may be displayed based on an object or window set as the default core element, irrespective of a touch input that is provided when the display 110 is enlarged/reduced. In the case of enlargement/reduction of the display 110, although the user does not select a core element separately, the screen area of the display 110 may be displayed based on a core element or the first window including the core element designated in the default information stored in advance for each screen area size.

Referring to FIG. 13, in the case of enlargement, a screen area may be enlarged in order of reference numerals 1300, 1302, 1304, and 1306.

If default information is stored that sets a default core element, such as a replay button 1320 or a first window 1316 including the replay button 1320, and the display 110 is enlarged, then an enlarged screen area of the display 110 may be displayed based on the replay button 1320 or the first window 1316 set as the default core element.

In the case of enlargement of the screen area 1300, 1302, 1304, and 1306, the size of the first window 1310, 1312, 1314, and 1316 set as the core element may be gradually reduced in accordance with the enlarged size of the screen area.

If the default core element is designated in advance, a core element may not be changed even though a touch input to a part 1325 of the screen area is input and maintained.

In this instance, if a user desires to select a core element manually, and differently from the default core element, the user may cancel the default core element. After cancelling the default core element, if the user selects a core element when the display 110 is enlarged/reduced, the screen area that is enlarged/reduced may be based on the core element that is manually selected by the user.

Figure 14:
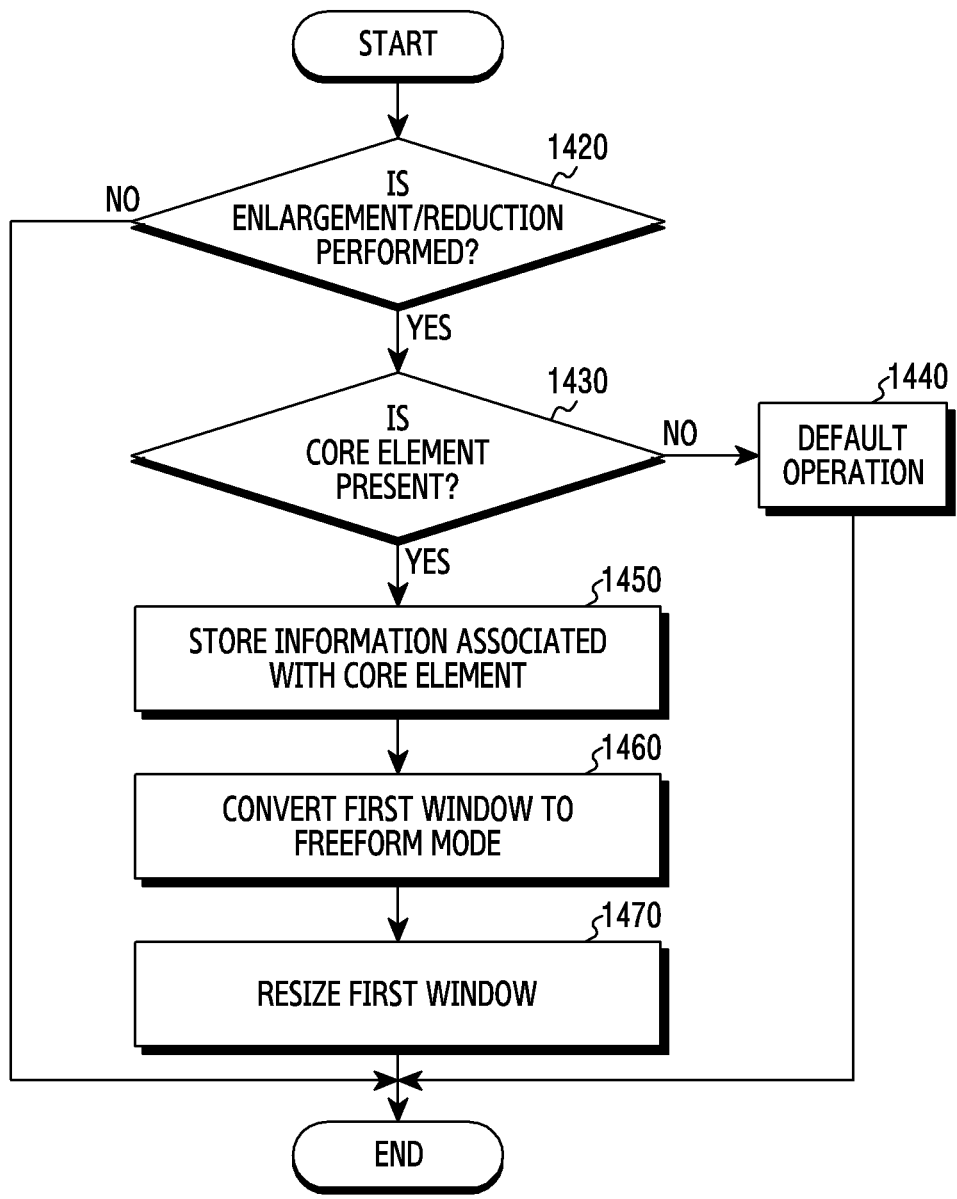
FIG. 14 is a flowchart illustrating a screen control method of an electronic device according to an embodiment.

FIG. 14 is a flowchart illustrating a screen control method of an electronic device according to an embodiment.

The electronic device 100 may operate in an idle state before the display 110 is enlarged/reduced.

In operation 1420, the electronic device 100 may determine whether the display 110 is enlarged/reduced. For example, upon reception of a user input (e.g., a slide-in/slide-out input or a roll-in/roll-out input) that enlarges the size of the display 110, the electronic device 100 may identify whether an event for enlarging/reducing the display 110 occurs.

If a result of the determination in operation 1420 shows that the display 110 is not enlarged/reduced, the electronic device 100 may maintain an idle state.

If the result of the determination in operation 1420 shows that the display 110 is enlarged/reduced, the electronic device 100 may proceed with operation 1430.

In operation 1430, the electronic device 100 may determine whether a core element selected by a user is present. For example, while a screen area of the display 110 is enlarged/reduced according to a user input, the electronic device 100 may identify whether a touch input to at least a part (e.g., a core element) of the screen area is received. Alternatively, the electronic device 100 may identify whether a default core element is present, which is set in advance by the user in association with a first window (e.g., a music application) which is being displayed in the screen area.

If a result of the determination in operation 1430 shows that the core element selected by the user is not present, the electronic device 100 may proceed with operation 1440. In operation 1440, the electronic device 100 may perform a predetermined default operation (an operation of enlarging/reducing the first window including a core element).

If the result of the determination in operation 1430 shows that the core element selected by the user is present, the electronic device 100 may calculate the pivot of the selected core element and may store information associated with the calculated pivot in operation 1450. The electronic device 100 may store information associated with the overall screen area (e.g., a full screen or a multi-window screen) including the selected core element. The information may include the size of each window being displayed and the displaying state of each window (e.g., the location of displaying, a graphic element, and an operation mode (e.g. a freeform mode, or a general mode)).

In operation 1460, the electronic device 100 may convert the first window including the core element into a freeform mode for freely changing a size. In the freeform mode, the size and the displaying state of the first window may be changed in accordance with a change in the size of the screen area.

In operation 1470, the electronic device 100 may calculate the movement of the pivot of the core element according to the degree of the enlargement/reduction (e.g., the enlarged/reduced distance or area) of the screen area of the electronic device 100, enlarge/reduce the size of the first window including the core element based on the moved pivot, and display the resizing of the first window.

The scheme of changing the size of the first window according to a change in the size of the screen area may be as follows.

In order to change the size and the displaying state of the first window in accordance with the size of the screen area, the electronic device 100 may store information associated with the whole area (full resolution) of the first window displayed in the screen area before the conversion to the freeform mode.

For example, in the case of the first window is a first application area (e.g., a music application area), if the screen area is enlarged/reduced, the framework of the electronic device 100 may reduce the size of the first window in accordance with the size of enlarged/reduced screen area, and may display the reduced first window in the enlarged/reduced screen area. The changed size of the first window may not be reported to the first application (e.g., music application).

Alternatively, if the first window is the first application area (e.g., a music application area), the framework may define an event related to the first application, and may not respond to a window size intentionally when the event occurs. In this instance, in the case of enlargement/reduction of the screen area, the framework of the electronic device 100 may transfer the event to the first application, and the first application may ignore the event, as opposed to processing the event, even though the changed size of the window is transferred.

The method of resizing the first window as described above is merely an example, may not limit the disclosure, and various applications or modification thereof for controlling the size of a window in the screen area in accordance with the size of the screen area are also possible.

Figure 15:
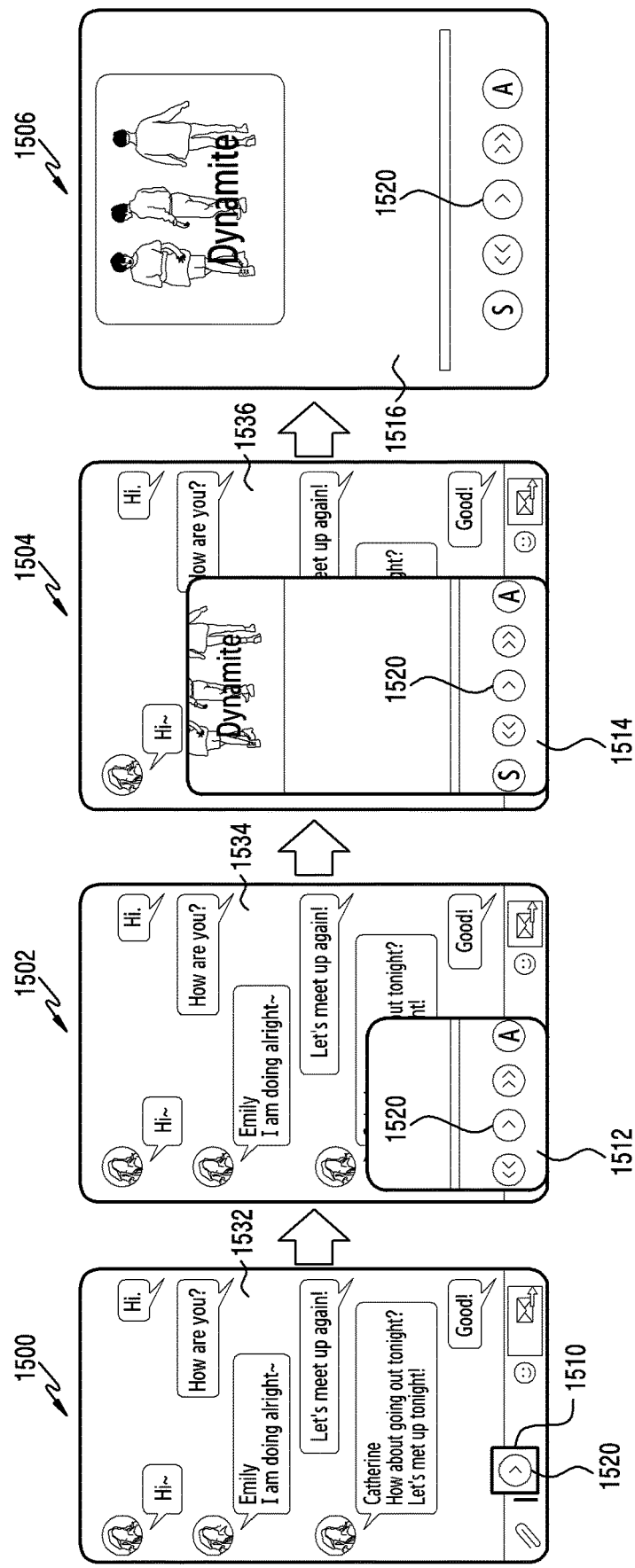
FIG. 15 is a diagram illustrating an example of a screen of an electronic device which has a fixed form factor according to an embodiment.

FIG. 15 is a diagram illustrating the example in which a reduced first window 1510 including a replay button 1520 of a first application (e.g., a music application) is set in advance as a default core element.

The replay button 1520 is an example of a core element set in advance. Reference numerals 1510, 1512, 1514, and 1516 are examples of a first window including the core element. Reference numerals 1532, 1534, and 1536 are examples of a second window. Elements related to the first application (e.g., a music application) may be displayed in the first window 1510, 1512, 1514, and 1516. Elements related to a second application (e.g., a chatting application) may be displayed in the second window 1532, 1534, and 1536.

In association with the first window 1510, 1512, 1514, and 1516 which is displayed in the screen area, the replay button 1520 of the first application (e.g., a music application) is selected as a core element in the first window 1510, 1512, 1514 and 1516, and information associated with the core element or the window 1510, 1512, 1514, and 1516 including the core element may be stored as default information.

A reference numeral 1500 is an example of the screen area before enlargement. Reference numerals 1502 and 1504 are examples of the screen area in the state of being enlarged. The reference numeral 1506 is an example of the screen area of which enlargement is complete.

As the size of the screen area is gradually enlarged, the size of the first window 1510, 1512, 1514, and 1516 including the replay button 1520 (which is the core element) may be gradually enlarged.

In the enlarged first window 1512, 1514, and 1516, displaying of the replay button 1520 which is the core element may be maintained, and elements adjacent to the replay button 1520 (e.g., objects of a music application) included in the same first window may be gradually enlarged in size and/or initially displayed as to newly appear. In the case of enlargement, the replay button 1520 may remain in an activated state in the first window 1510, 1512, 1514, and 1516.

In the case of reduction, the screen area may be reduced in the example illustrative order of reference numerals 1506, 1504, 1502, and 1500.

As the size of the screen area is gradually reduced, the size of the first window 1516, 1514, 1512, and 1510 including the replay button 1520 which is the core element may be gradually reduced while maintained in display.

As the size of the screen area is gradually reduced, display of the replay button 1520 which is the core element may be maintained in the first window 1514, 1512, and 1510 in the reduced screen area, and elements adjacent to the replay button 1520 (e.g., objects of the music application) may be gradually reduced in size and/or removed from display as to disappear.

In the case of reduction, the replay button 1520 may remain in an activated state in the first window 1516, 1514, 1512, and 1510.

FIG. 16 is a block diagram illustrating an electronic device 1601 in a network environment 1600 according to certain embodiments. Referring to FIG. 16, the electronic device 1601 in the network environment 1600 may communicate with an electronic device 1602 via a first network 1698 (e.g., a short-range wireless communication network), or at least one of an electronic device 1604 or a server 1608 via a second network 1699 (e.g., a long-range wireless communication network). According to an embodiment, the electronic device 1601 may communicate with the electronic device 1604 via the server 1608. According to an embodiment, the electronic device 1601 may include a processor 1620, memory 1630, an input module 1650, a sound output module 1655, a display module 1660, an audio module 1670, a sensor module 1676, an interface 1677, a connecting terminal 1678, a haptic module 1679, a camera module 1680, a power management module 1688, a battery 1689, a communication module 1690, a subscriber identification module (SIM) 1696, or an antenna module 1697. In some embodiments, at least one of the components (e.g., the connecting terminal 1678) may be omitted from the electronic device 1601, or one or more other components may be added in the electronic device 1601. In some embodiments, some of the components (e.g., the sensor module 1676, the camera module 1680, or the antenna module 1697) may be implemented as a single component (e.g., the display module 1660).

The processor 1620 may execute, for example, software (e.g., a program 1640) to control at least one other component (e.g., a hardware or software component) of the electronic device 1601 coupled with the processor 1620, and may perform various data processing or computation. According to an embodiment, as at least part of the data processing or computation, the processor 1620 may store a command or data received from another component (e.g., the sensor module 1676 or the communication module 1690) in volatile memory 1632, process the command or the data stored in the volatile memory 1632, and store resulting data in non-volatile memory 1634. According to an embodiment, the processor 1620 may include a main processor 1621 (e.g., a central processing unit (CPU) or an application processor (AP)), or an auxiliary processor 1623 (e.g., a graphics processing unit (GPU), a neural processing unit (NPU), an image signal processor (ISP), a sensor hub processor, or a communication processor (CP)) that is operable independently from, or in conjunction with, the main processor 1621. For example, when the electronic device 1601 includes the main processor 1621 and the auxiliary processor 1623, the auxiliary processor 1623 may be adapted to consume less power than the main processor 1621, or to be specific to a specified function. The auxiliary processor 1623 may be implemented as separate from, or as part of the main processor 1621.

The auxiliary processor 1623 may control at least some of functions or states related to at least one component (e.g., the display module 1660, the sensor module 1676, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). According to an embodiment, the auxiliary processor 1623 (e.g., an image signal processor or a communication processor) may be implemented as part of another component (e.g., the camera module 1680 or the communication module 1690) functionally related to the auxiliary processor 1623. According to an embodiment, the auxiliary processor 1623 (e.g., the neural processing unit) may include a hardware structure specified for artificial intelligence model processing. An artificial intelligence model may be generated by machine learning. Such learning may be performed, e.g., by the electronic device 1601 where the artificial intelligence is performed or via a separate server (e.g., the server 1608). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1630 may store various data used by at least one component (e.g., the processor 1620 or the sensor module 1676) of the electronic device 1601. The various data may include, for example, software (e.g., the program 1640) and input data or output data for a command related thereto. The memory 1630 may include the volatile memory 1632 or the non-volatile memory 1634.

The program 1640 may be stored in the memory 1630 as software, and may include, for example, an operating system (OS) 1642, middleware 1644, or an application 1646.

The input module 1650 may receive a command or data to be used by another component (e.g., the processor 1620) of the electronic device 1601, from the outside (e.g., a user) of the electronic device 1601. The input module 1650 may include, for example, a microphone, a mouse, a keyboard, a key (e.g., a button), or a digital pen (e.g., a stylus pen).

The sound output module 1655 may output sound signals to the outside of the electronic device 1601. The sound output module 1655 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1660 may visually provide information to the outside (e.g., a user) of the electronic device 1601. The display module 1660 may include, for example, a display, a hologram device, or a projector and control circuitry to control a corresponding one of the display, hologram device, and projector. According to an embodiment, the display module 1660 may include a touch sensor adapted to detect a touch, or a pressure sensor adapted to measure the intensity of force incurred by the touch.

The audio module 1670 may convert a sound into an electrical signal and vice versa. According to an embodiment, the audio module 1670 may obtain the sound via the input module 1650, or output the sound via the sound output module 1655 or a headphone of an external electronic device (e.g., an electronic device 1602) directly (e.g., wiredly) or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. According to an embodiment, the sensor module 1676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device (e.g., the electronic device 1602) directly (e.g., wiredly) or wirelessly. According to an embodiment, the interface 1677 may include, for example, a high definition multimedia interface (HDMI), a universal serial bus (USB) interface, a secure digital (SD) card interface, or an audio interface.

A connecting terminal 1678 may include a connector via which the electronic device 1601 may be physically connected with the external electronic device (e.g., the electronic device 1602). According to an embodiment, the connecting terminal 1678 may include, for example, a HDMI connector, a USB connector, a SD card connector, or an audio connector (e.g., a headphone connector).

The haptic module 1679 may convert an electrical signal into a mechanical stimulus (e.g., a vibration or a movement) or electrical stimulus which may be recognized by a user via his tactile sensation or kinesthetic sensation. According to an embodiment, the haptic module 1679 may include, for example, a motor, a piezoelectric element, or an electric stimulator.

The camera module 1680 may capture a still image or moving images. According to an embodiment, the camera module 1680 may include one or more lenses, image sensors, image signal processors, or flashes.

The power management module 1688 may manage power supplied to the electronic device 1601. According to an embodiment, the power management module 1688 may be implemented as at least part of, for example, a power management integrated circuit (PMIC).

The battery 1689 may supply power to at least one component of the electronic device 1601. According to an embodiment, the battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the electronic device 1602, the electronic device 1604, or the server 1608) and performing communication via the established communication channel. The communication module 1690 may include one or more communication processors that are operable independently from the processor 1620 (e.g., the application processor (AP)) and supports a direct (e.g., wired) communication or a wireless communication. According to an embodiment, the communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device via the first network 1698 (e.g., a short-range communication network, such as Bluetooth™, wireless-fidelity (Wi-Fi) direct, or infrared data association (IrDA)) or the second network 1699 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1692 may identify and authenticate the electronic device 1601 in a communication network, such as the first network 1698 or the second network 1699, using subscriber information (e.g., international mobile subscriber identity (IMSI)) stored in the subscriber identification module 1696.

The wireless communication module 1692 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1692 may support a high-frequency band (e.g., the mmWave band) to achieve, e.g., a high data transmission rate. The wireless communication module 1692 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1692 may support various requirements specified in the electronic device 1601, an external electronic device (e.g., the electronic device 1604), or a network system (e.g., the second network 1699). According to an embodiment, the wireless communication module 1692 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1697 may transmit or receive a signal or power to or from the outside (e.g., the external electronic device) of the electronic device 1601. According to an embodiment, the antenna module 1697 may include an antenna including a radiating element implemented using a conductive material or a conductive pattern formed in or on a substrate (e.g., a printed circuit board (PCB)). According to an embodiment, the antenna module 1697 may include a plurality of antennas (e.g., array antennas). In such a case, at least one antenna appropriate for a communication scheme used in the communication network, such as the first network 1698 or the second network 1699, may be selected, for example, by the communication module 1690 (e.g., the wireless communication module 1692) from the plurality of antennas. The signal or the power may then be transmitted or received between the communication module 1690 and the external electronic device via the selected at least one antenna. According to an embodiment, another component (e.g., a radio frequency integrated circuit (RFIC)) other than the radiating element may be additionally formed as part of the antenna module 1697.

According to certain embodiments, the antenna module 1697 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1601 and the external electronic device 1604 via the server 1608 coupled with the second network 1699. Each of the electronic devices 1602 or 1604 may be a device of a same type as, or a different type, from the electronic device 1601. According to an embodiment, all or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1601. The electronic device 1601 may provide the outcome, with or without further processing of the outcome, as at least part of a reply to the request. To that end, a cloud computing, distributed computing, mobile edge computing (MEC), or client-server computing technology may be used, for example. The electronic device 1601 may provide ultra low-latency services using, e.g., distributed computing or mobile edge computing. In another embodiment, the external electronic device 1604 may include an internet-of-things (IoT) device. The server 1608 may be an intelligent server using machine learning and/or a neural network. According to an embodiment, the external electronic device 1604 or the server 1608 may be included in the second network 1699. The electronic device 1601 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 1640) including one or more instructions that are stored in a storage medium (e.g., internal memory 1636 or external memory 1638) that is readable by a machine (e.g., the electronic device 1601). For example, a processor (e.g., the processor 1620) of the machine (e.g., the electronic device 1601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to certain embodiments, an electronic device (e.g., the electronic device 100 of FIG. 1) may include a display (e.g., the display 110 of FIG. 1) and at least one processor (e.g., the processor 120 of FIG. 1) connected to the display. The at least one processor may be configured to: display a plurality of elements in a screen area of the display; receive a user input that resizes the screen area; identify a core element among the plurality of elements; and display the screen area resized based on the received user input and the core element. In the resized screen area, a window including the core element is displayed in a size in accordance with to the size of the resized screen area.

According to certain embodiments, when the size of the screen area is enlarged, the size of the window including the core element may be displayed by being gradually reduced or enlarged.

According to certain embodiments, when the size of the screen area is reduced, the size of the window including the core element may be displayed by being gradually reduced or enlarged.

According to certain embodiments, the core element may be identified based on a touch input to at least a part of the screen area.

According to certain embodiments, the touch input may be one of: a touch input received while the user input is maintained; a touch input received within a predetermined period of time before the user input; and a touch input received within a predetermined period of time after the user input.

According to certain embodiments, the electronic device may further include a memory (e.g., the memory 1630 of FIG. 16). Default information for each screen area size may be stored in advance in the memory of the electronic device. The core element may be identified based on the default information for each screen area size.

According to certain embodiments, the electronic device may further include a memory. Priority information which designates priority associated with at least some of the plurality of elements displayed in the screen area may be stored in advance in the memory of the electronic device. At least one element to be displayed in the resized screen area may be determined based on the size of the resized screen area, the core element, and the priority information.

According to certain embodiments, when the screen area is resized, displaying of the core element may be maintained and elements adjacent to the core element are gradually reduced or disappear in the window of the resized screen area, and the plurality of elements may be gradually enlarged or appear in a second window of the resized screen area.

According to certain embodiments, when the screen area is resized, displaying of the core element may be maintained and elements adjacent to the core element may be gradually enlarged or appear in the window of the resized screen area, and a plurality of elements may be gradually reduced or disappear in a second window of the resized screen area.

According to certain embodiments, while the user input for re-sizing the screen area is received, a touch input to at least a part of the screen area may be received, and the core element may be identified based on the touch input.

According to certain embodiments, while the screen area is resized according to the user input for resizing the screen area, a touch input to an area corresponding to the core element in the screen area may be received, and the core element may be identified based on the touch input.

According to certain embodiments, while the user input for resizing the screen area is received, a touch input to at least a part of the screen area may be received and released, and the size of the window including the core element may be fixed based on the releasing of the touch input.

According to certain embodiments, the display may be a rollable display, and the user input may be an input based on a rolling operation for resizing a rollable display area exposed through a foreside of the electronic device. The rolling operation may be an automatic or a semi-automatic rolling operation by a driving body (e.g., a motor) included in the electronic device according to a manual rolling operation or according to a user input.

According to certain embodiments, the display may be a slidable display, and the user input may be an input based on a sliding operation for resizing a slidable display area exposed through a foreside of the electronic device. The sliding operation may be an automatic or a semi-automatic sliding operation by a driving body (e.g., a motor) included in the electronic device according to a manual sliding operation or according to a user input.

According to certain embodiments, a screen control method of an electronic device including a display may include: an operation of displaying a plurality of elements in a screen area of the display; an operation of receiving a user input for resizing the screen area; an operation of identifying a core element among the plurality of elements; and an operation of displaying the screen area resized based on the received user input and the core element. In the resized screen area, the size of a window including the core element may be displayed based on the size of the resized screen area.

According to certain embodiments, the core element may be identified based on a touch input to at least a part of the screen area.

According to certain embodiments, the touch input may be one of: a touch input received while the user input is maintained; a touch input received within a predetermined period of time before the user input; and a touch input received within a predetermined period of time after the user input.

According to certain embodiments, the screen control method may further include an operation of storing default information for each screen area size. The core element may be identified based on the default information for each screen area size.

According to certain embodiments, the screen control method may further include an operation of storing priority information which designates priority associated with at least some of the plurality of elements displayed in the screen area. At least one element to be displayed in the resized screen area may be determined based on the size of the resized screen area, the core element, and the priority information.

According to certain embodiments, while the user input for resizing the screen area is received, a touch input to the core element in the screen area may be received, and the core element may be identified based on the touch input.

According to certain embodiments, while the screen area is resized according to the user input for resizing the screen area, a touch input to an area corresponding to the core element in the screen area may be received, and the core element may be identified based on the touch input.

According to certain embodiments, while the user input for resizing the screen area is received, a touch input to at least a part of the screen area may be received and released, and the size of the window including the core element may be fixed based on the releasing of the touch input.

What is claimed is:

1. An electronic device, comprising:
    a flexible display having a display area that is variable physically; and
    at least one processor operably connected to the flexible display,
    wherein the at least one processor is configured to:
        control the flexible display to display a first window including a plurality of elements of a first application on the display area;
        receive a user input to request physically enlarging the display area;
        in response to the user input, physically enlarge the display area of the flexible display;
        identify a core element among the plurality of elements in the first window; and
        display a second window including at least part of the plurality of elements on the physically enlarged display area,
        wherein, as the display area is physically enlarged, a size of the second window and a number of a plurality of elements in the second window is gradually reduced, and the core element is maintained in the second window.

2. The electronic device of claim 1, wherein the at least one processor is further configured to:
    detect a touch input to the display area selecting a first element from among the plurality of elements; and
    wherein identifying the core element includes setting the first element as the core element based on the detected touch input.

3. The electronic device of claim 2, wherein the touch input is:
    received while the user input is maintained,
    received within a predetermined period of time before initial detection of the user input or
    received within a predetermined period of time after the initial detection of the user input.

4. The electronic device of claim 2, wherein the touch input selecting the first element identified as the core element is detected while the user input is received.

5. The electronic device of claim 4, wherein the touch input selecting the first element identified as the core element is maintained as the display area is physically enlarged in response to the user input.

6. The electronic device of claim 1, further comprising a memory,
    wherein default information for each of a plurality of potential display areas for the flexible display is stored in the memory, and
    wherein the core element is identified based at least in part on the default information.

7. The electronic device of claim 1, further comprising a memory,
    wherein priorities associated with at least some of the plurality of elements are stored in advance in the memory, and
    wherein at least one element is selected from among the plurality of elements in the first window for display of the second window based on a size of the physically enlarged display area, the core element, and the priorities.

8. The electronic device of claim 1, wherein, as the display area is physically enlarged:

a third window separated from the second window, is added to the flexible display, and a size of the third window and a number of a plurality of elements in the third window are gradually enlarged.

9. The electronic device of claim 1, wherein the at least one processor is further configured to:

receive a touch input to at least a part of the display area and detect a release of the touch input, while the user input is maintained, and set a size of the second window including the core element based on the release of the touch input.

10. The electronic device of claim 1, wherein the flexible display is a rollable display, and wherein the user input includes a rolling operation for enlarging a display area of the rollable display that is exposed through a frontal portion of the electronic device.

11. The electronic device of claim 1, wherein the flexible display is a slidable display, and wherein the user input includes a sliding operation for enlarging a display area of the slidable display that is exposed through a front portion of the electronic device.

12. A method of an electronic device, the method comprising:

displaying a first window including a plurality of elements of a first application on a flexible display having a display area that is variable physically;

receiving, via input circuitry, a user input to request physically enlarging the display area;

in response to the user input, physically enlarge the display area of the flexible display;

identifying, via at least one processor, a core element from among the plurality of elements in the first window; and displaying a second window including at least part of the plurality of elements on the physically enlarged display area, wherein, as the display area is physically enlarged, a size of the second window and a number of a plurality of elements in the second window is gradually reduced, and the core element is maintained in the second window.

13. The method of claim 12, further comprising:

detecting a touch input to the display area selecting a first element from among the plurality of elements, wherein identifying the core element includes setting the first element as the core element based on the detected touch input.

14. The method of claim 13, wherein the touch input is:

received while the user input is maintained, received within a predetermined period of time before initial detection of the user input, or received within a predetermined period of time after the initial detection of the user input.

15. The method of claim 13, wherein the touch input selecting the first element identified as the core element is detected while the user input is received.

16. The method of claim 15, wherein the touch input selecting the first element identified as the core element is maintained as the display area is physically enlarged in response to the user input.

17. The method of claim 12, further comprising:

storing in a memory default information for each of a plurality of potential display areas for the flexible display, wherein the core element is identified based at least in part on the default information.

18. The method of claim 12, further comprising:

storing priorities associated with at least some of the plurality of elements, wherein at least one element is selected from among the plurality of elements in the first window for display of the second window based on a size of the physically enlarged display area, the core element, and the priorities.

19. The method of claim 12, further comprising:

receiving a touch input to at least a part of the display area and detecting a release of the touch input, while the user input to request physically enlarging the display area is maintained, setting a size of the second window including the core element based on the release of the touch input.

* * * * *